US008804542B2

(12) United States Patent
Ko et al.

(10) Patent No.: US 8,804,542 B2
(45) Date of Patent: *Aug. 12, 2014

(54) METHOD OF TRANSMITTING FEEDBACK DATA IN A MULTIPLE ANTENNA SYSTEM

(75) Inventors: Hyun Soo Ko, Seoul (KR); Bin Chul Ihm, Seoul (KR); Jin Young Chun, Seoul (KR); Wook Bong Lee, Seoul (KR); Moon Il Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,020

(22) Filed: Apr. 20, 2012

(65) Prior Publication Data

US 2012/0201165 A1 Aug. 9, 2012

Related U.S. Application Data

(63) Continuation of application No. 12/189,542, filed on Aug. 11, 2008, now Pat. No. 8,184,544.

(60) Provisional application No. 60/978,140, filed on Oct. 8, 2007, provisional application No. 61/025,304, filed on Feb. 1, 2008.

(30) Foreign Application Priority Data

| Aug. 10, 2007 | (KR) | .......................... 10-2007-0080519 |
| Aug. 14, 2007 | (KR) | .......................... 10-2007-0081913 |
| Nov. 19, 2007 | (KR) | .......................... 10-2007-0118168 |
| Jan. 18, 2008 | (KR) | .......................... 10-2008-0005864 |
| Jul. 28, 2008 | (KR) | .......................... 10-2008-0073340 |

(51) Int. Cl.
*H04L 12/26* (2006.01)

(52) U.S. Cl.
USPC ....................................................... 370/249

(58) Field of Classification Search
USPC ............ 370/252, 254, 310, 395.43, 431, 458
See application file for complete search history.

(56) References Cited

U.S. PATENT DOCUMENTS

| 6,615,382 B1 | 9/2003 | Kang et al. |
| 8,036,131 B2 | 10/2011 | Roh et al. |

(Continued)

FOREIGN PATENT DOCUMENTS

| EP | 1569403 | 8/2005 |
| EP | 1750399 | 2/2007 |

(Continued)

OTHER PUBLICATIONS

United States Patent and Trademark Office U.S. Appl. No. 12/666,612, Notice of Allowance dated Feb. 12, 2013, 9 pages.

(Continued)

*Primary Examiner* — Yemane Mesfin
*Assistant Examiner* — Mon Cheri Davenport
(74) *Attorney, Agent, or Firm* — Lee, Hong, Degerman, Kang & Waimey

(57) ABSTRACT

A method of transmitting feedback data in a multiple antenna system comprises receiving a request message of feedback data on a downlink channel, the request message comprising uplink scheduling information, selecting a set of M (M≥1) subbands within a plurality of subbands, generating the feedback data, the feedback data comprising a frequency selective PMI (precoding matrix indicator), a frequency flat PMI, a best band CQI (channel quality indicator) and a whole band CQI, and transmitting the feedback data on a uplink channel allocated to the uplink scheduling information.

12 Claims, 31 Drawing Sheets

(56) References Cited

U.S. PATENT DOCUMENTS

| | | | |
|---|---|---|---|
| 8,184,544 B2* | 5/2012 | Ko et al. | 370/249 |
| 8,369,440 B2* | 2/2013 | Senba | 375/267 |
| 8,411,617 B2* | 4/2013 | Chun et al. | 370/328 |
| 2002/0018530 A1 | 2/2002 | Kim et al. | |
| 2003/0148738 A1 | 8/2003 | Das et al. | |
| 2004/0165676 A1 | 8/2004 | Krishnan et al. | |
| 2005/0201474 A1 | 9/2005 | Cho et al. | |
| 2006/0071052 A1 | 4/2006 | Conlon et al. | |
| 2006/0146760 A1 | 7/2006 | Khandekar et al. | |
| 2006/0176803 A1 | 8/2006 | Oh et al. | |
| 2007/0097856 A1 | 5/2007 | Wang et al. | |
| 2008/0043677 A1 | 2/2008 | Kim et al. | |
| 2008/0176575 A1 | 7/2008 | Sutton | |
| 2008/0232449 A1 | 9/2008 | Khan et al. | |
| 2008/0233902 A1 | 9/2008 | Pan et al. | |
| 2008/0268785 A1 | 10/2008 | McCoy et al. | |
| 2008/0268862 A1 | 10/2008 | Kent et al. | |
| 2008/0303699 A1 | 12/2008 | Zhang et al. | |
| 2009/0034636 A1 | 2/2009 | Kotecha et al. | |
| 2009/0052405 A1 | 2/2009 | Ko et al. | |
| 2009/0115649 A1 | 5/2009 | Wu | |
| 2010/0085912 A1 | 4/2010 | Chun et al. | |
| 2010/0113057 A1 | 5/2010 | Englund et al. | |

FOREIGN PATENT DOCUMENTS

| | | |
|---|---|---|
| EP | 1780925 | 5/2007 |
| JP | 2009-004921 | 1/2009 |
| JP | 2010-527184 | 8/2010 |
| WO | 2006051372 | 5/2006 |
| WO | 2006071052 | 7/2006 |
| WO | 2006130866 | 12/2006 |
| WO | 2007/052941 | 5/2007 |
| WO | 2007052941 | 5/2007 |

OTHER PUBLICATIONS

Huawei, "DL control signaling to support MIMO", R1-072905, 3GPP TSG RAN WG1 #49bis, Jun. 2007.

Korean Intellectual Property Office Application Serial No. 10-2008-0056001, Notice of Allowance dated Jun. 18, 2013, 5 pages.

Ericsson, "Multiple CQI formats", R1-073055, TSG-RAN WG1 #49bis, Jun. 2007.

Samsung, "LTE uplink CQI report format", R1-073107, 3GPP TSG RAN WG1 Meeting #49-bis, Jun. 2007.

Samsung, "CQI report transmission using PUSCH resource", R1-073118, 3GPP TSG RAN WG1 Meeting #49bis, Jun. 2007.

Huawei, "DL Control Signaling of MIMO PMI Information for SU-MIMO", 3GPP TSG RAN WG1 #49, R1-072318, May 2007.

Texas Instruments, et al., "Proposed Way Forward on Codebook Design for E-UTRA", 3GPP TSG RAN WG1 48, R1-070728, Feb. 2007.

Texas Instruments, "Further Details on Codebook-Based Pre-coding for E-UTRA", 3GPP TSG RAN WG1 47bis, R1-070270, Jan. 2007.

In the USPTO U.S. Appl. No. 12/666,612, Final Office Action dated Oct. 26, 2012, 11 pages.

In the Japanese Patent Office Application Serial No. 2010-512093, Office Action dated Nov. 6, 2012, 3 pages.

United States Patent and Trademark Office U.S. Appl. No. 13/169,800, Notice of Allowance dated Nov. 21, 2012, 33 pages.

Huawei, "Downlink Adaptation/Scheduling Guided by an Efficient CQI-Feedback Scheme," R1-060821, TSG RAN WG1 Meeting 44bis, Mar. 2006, XP-050101734.

Huawei, "Baseline Uplink E-CQI Message—Content and Size," R1-063036, TSG RAN WG1 RAN1 Meeting #47, Nov. 2006, XP-050103503.

Huawei, "Overhead Reduction of UL CQI Signalling for E-UTRA DL," R1-061819, 3GPP TSG RAN LTE Ad Hoc, Jun. 2006, XP-050111636.

Rohde & Schwarz, "UMTS Long Term Evolution (LTE) Technology Introduction", Application Note 1MA111, Mar. 2007.

LG Electronics, "CQI overhead reduction for MIMO in frequency domain", R1-071545, 3GPP TSG RAN WG1 #48bis, Mar. 2007.

LG Electronics, "Frequency granularity of CQI and PMI feedback", R1-073491, 3GPP TSG RAN WG1 #50, Aug. 2007.

LG Electronics, "Investigation on tradeoff between PMI overhead and performance", R1-074215, 3GPP TSG RAN WG1 Meeting #50bis, Oct. 2007.

Motorola, "PMI Downlink Signaling and Downlink PDCCH Format", R1-073077, 3GPP TSG RAN1#49bis, Jun. 2007.

Samsung, "Uplink data-non-associated control signaling", R1-071573, 3GPP TSG RAN WG1 Meeting #48bis, Mar. 2007.

Huawei, "Unified uplink CQI signaling by efficient labeling", R1-061246, TSG RAN WG1 meeting 45, May 2006.

Samsung, "Design of PDCCH format in support of MIMO," R1-073110, 3GPP TSG RAN WG1 Meeting #49-bis, Jun. 2007, 3 pages.

Japan Patent Office Application Serial No. 2010-512093, Office Action dated Mar. 4, 2013, 3 pages.

European Patent Office Application Serial No. 08793135.8, Certificate dated Dec. 18, 2013, 34 pages.

Huawei, "Downlink adaptation/scheduling guided by an efficient CQI-feedback scheme," TSG RAN WG1 meeting 44bis, R1-060821, Mar. 2006, 5 pages.

Huawei, "Baseline uplink E-CQI message—content and size," TSG RAN WG1 RAN1 meeting #47, R1-063036, Nov. 2006, 5 pages.

Korean Intellectual Property Office Application Serial No. 10-2008-0073340, Office Action dated Apr. 14, 2014, 4 pages.

* cited by examiner

METHOD OF TRANSMITTING FEEDBACK DATA IN A MULTIPLE ANTENNA SYSTEM

CROSS-REFERENCE TO RELATED APPLICATIONS

This application is a continuation of U.S. Application Ser. No. 12/189,542, filed on Aug. 11, 2008, now U.S. Pat. No. 8,184,544, which claims the benefit of U.S. Provisional application Ser. No. 60/978,140 filed on Oct. 8, 2007, and U.S. Provisional application Ser. No. 61/025,304 filed on Feb. 1, 2008, and also claims the benefit of earlier filing date and right of priority to Korean Patent Application No. 10-2007-0080519 filed on Aug. 10, 2007, Korean Patent Application No. 10-2007-0081913 filed on Aug. 14, 2007, Korean Patent Application No. 10-2007-0118168 filed on Nov. 19, 2007, Korean Patent Application No. 10-2008-0005864 filed on Jan. 18, 2008, and Korean Patent Application No. 10-2008-0073340 filed on Jul. 28, 2008, the contents of all of which are incorporated by reference herein in their entireties.

BACKGROUND

1. Technical Field

The present invention relates to wireless communications, and more particularly, to a method for transmitting feedback data in a multiple antenna system.

2. Related Art

Wireless communication systems are widely used to provide various types of communications. For example, voice and/or data are provided by the wireless communication systems. A conventional wireless communication system provides multiple users with one or more shared resources. For example, the wireless communication system can use various multiple access schemes such as code division multiple access (CDMA), time division multiple access (TDMA), and frequency division multiple access (FDMA).

An orthogonal frequency division multiplexing (OFDM) scheme uses a plurality of orthogonal subcarriers. Further, the OFDM scheme uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and spectral efficiency can be improved through selective scheduling in a frequency domain by utilizing channel characteristics which are different from one subcarrier to another. An orthogonal frequency division multiple access (OFDMA) scheme is an OFDM-based multiple access scheme. According to the OFDMA scheme, a radio resource can be more efficiently used by allocating different subcarriers to multiple users.

Recently, to maximize performance and communication capability of the wireless communication system, attention is paid to a multiple input multiple output (MIMO) system. Being evolved from the conventional technique in which a single transmit (Tx) antenna and a single receive (Rx) antenna are used, a MIMO technique uses multiple Tx antennas and multiple Rx antennas in order to improve efficiency of data transmission and reception. The MIMO system is also referred to as a multiple antenna system. In the MIMO technique, instead of receiving one whole message through a single antenna path, data segments are received through a plurality of antennas and are then assembled into one piece of data. As a result, a data transfer rate can be improved in a specific range, or a system range can increase with respect to a specific data transfer rate.

Hereinafter, downlink is defined as a communication link from a base station (BS) to a user equipment (UE), and uplink is defined as a communication link from the UE to the BS.

In general, the BS schedules uplink and downlink radio resources in the wireless communication system. User data or control signals are carried using the uplink and downlink radio resources. A channel for carrying user data is referred to as a data channel. A channel for carrying control information is referred to as a control channel.

For radio resource scheduling of the BS, the UE reports feedback data to the BS. In the multiple antenna system, the feedback data includes a channel quality indicator (CQI), a rank indicator (RI), a precoding matrix indicator (PMI), etc. The UE transmits the feedback data (e.g., CQI, RI, PMI, etc.) to the BS. According to the feedback data received from a plurality of UEs, the BS schedules uplink and downlink radio resources. A whole frequency band is divided into a plurality of subbands. The BS can schedule the radio resources for each subband. From an aspect of radio resource scheduling of the BS, it is most effective when the UE obtains respective CQIs and PMIs for all subbands and reports the obtained CQIs and PMIs to the BS. However, a significantly large overhead is caused when the CQIs and PMIs for all subbands are transmitted with limited radio resources.

Accordingly, there is a need for a method for effectively transmitting CQIs and PMIs in a multiple antenna system.

SUMMARY

The present invention provides a method for transmitting feedback data in a multiple antenna system.

In an aspect, a method of transmitting feedback data in a multiple antenna system comprises receiving a request message of feedback data on a downlink channel, the request message comprising uplink scheduling information, selecting a set of M (M≥1) subbands within a plurality of subbands, generating the feedback data, the feedback data comprising a frequency selective PMI (precoding matrix indicator), a frequency flat PMI, a best band CQI (channel quality indicator) and a whole band CQI, the frequency selective PMI indicating the index of a precoding matrix selected from a codebook over the M selected subbands, the frequency flat PMI indicating the index of a precoding matrix selected from the codebook over the plurality of subbands, the best band CQI indicating a CQI value over the M selected subbands, the whole band CQI indicating a CQI value over the plurality of subbands, and transmitting the feedback data on a uplink channel allocated to the uplink scheduling information.

In another aspect, a method of transmitting feedback data in a multiple antenna system comprises selecting a set of M (M≥1) subbands within a plurality of subbands, and transmitting feedback data on a uplink shared channel, the feedback data comprising a frequency selective PMI, a frequency flat PMI, a best band CQI and a whole band CQI, the frequency selective PMI indicating the index of a precoding matrix selected from a codebook over the M selected subbands, the frequency flat PMI indicating the index of a precoding matrix selected from the codebook over the plurality of subbands, the best band CQI indicating a CQI value over the M selected subbands, the whole band CQI indicating a CQI value over the plurality of subbands.

DESCRIPTION OF EXEMPLARY EMBODIMENTS

Figure 1:
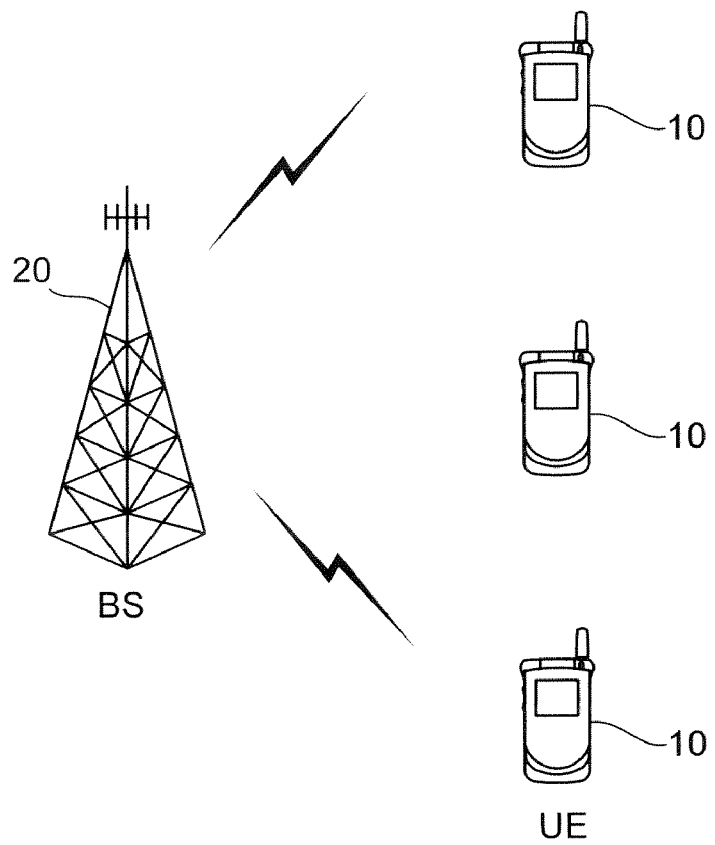
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

There is no restriction on a multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. For clarity, an OFDMA-based wireless communication system will be described hereinafter.

The wireless communication system may be a multiple antenna system. The multiple antenna system may be a multiple input multiple output (MIMO) system. Alternatively, the multiple antenna system may be a multiple-input single-output (MISO) system or a single-input multiple-output (SIMO) system. The MIMO system uses a plurality of transmit (Tx) antennas and a plurality of receive (Rx) antennas. The MISO system uses a plurality of Tx antennas and one Rx antenna. The SIMO system uses one Tx antenna and a plurality of Rx antennas.

Figure 2:
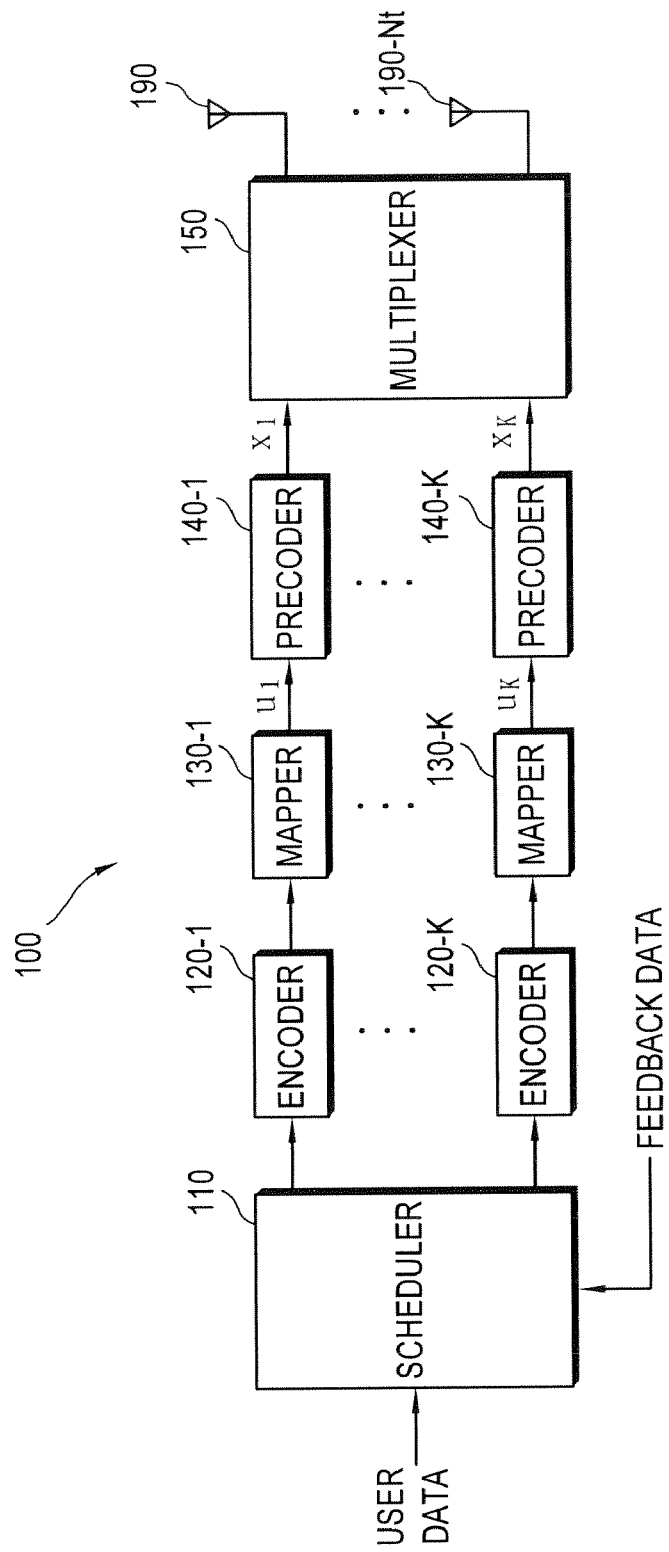
FIG. 2 is a block diagram showing a transmitter having multiple antennas.

FIG. 2 is a block diagram showing a transmitter having multiple antennas.

Referring to FIG. 2, a transmitter 100 includes a scheduler 110, channel encoders 120-1 to 120-K, mappers 130-1 to 130-K, precoders 140-1 to 140-K, and a multiplexer 150. The transmitter 100 includes Nt (Nt>1) Tx antennas 190-1 to 190-Nt. The transmitter 100 may be a part of a BS in downlink. The transmitter 100 may be a part of a UE in uplink.

The scheduler 110 receives data from N users and outputs K streams to be concurrently transmitted. By using channel information of each user, the scheduler 110 determines a user and a data transfer rate for transmitting data through available radio resources. The scheduler 110 extracts a CQI from feedback data, and selects a modulation and coding scheme (MCS) or the like. The CQI includes a signal to noise ratio (SNR), a signal to interference and noise ratio (SINR), etc., determined between the transmitter and a receiver.

The available radio resources allocated by the scheduler 110 denote radio resources used for data transmission in the wireless communication system. For example, all time slots are resources in a TDMA system, all codes and time slots are resources in a CDMA system, and all subcarrier and time slots are resources in an OFDMA system. The respective resources may be orthogonal to each other by definition in a time, code, or frequency domain so that interference to another user does not occur in the same cell or sector.

The channel encoders 120-1 to 120-K encode input streams according to a predetermined coding scheme, and thus generate coded data. The mappers 130-1 to 130-K map the coded data onto symbols representing locations on a signal constellation. These symbols are called data symbols. There is no restriction on a modulation scheme. The modulation scheme may be m-phase shift keying (m-PSK) or m-quadrature amplitude modulation (m-QAM). For example, the m-PSK may be binary PSK (BPSK), quadrature PSK (QPSK), or 8-PSK. The m-QAM may be 16-QAM, 64-QAM, or 256-QAM.

The precoders 140-1 to 140-K perform precoding on received data symbols $u_1, \ldots, u_K$ and thus generate input symbols $x_1, \ldots, x_K$. The precoding is a scheme for pre-processing data symbols to be transmitted. Examples of the precoding scheme include random beamforming (RBF), zero forcing beamforming (ZFBF), etc., in which input symbols are generated by applying a weighting vector or a precoding matrix to the data symbols.

The multiplexer 150 assigns the input symbols $x_1, \ldots, x_K$ to suitable subcarriers, and multiplexes the symbols according to a user. The multiplexed symbols are modulated and then transmitted through the Tx antennas 190-1 to 190-Nt.

Figure 3:
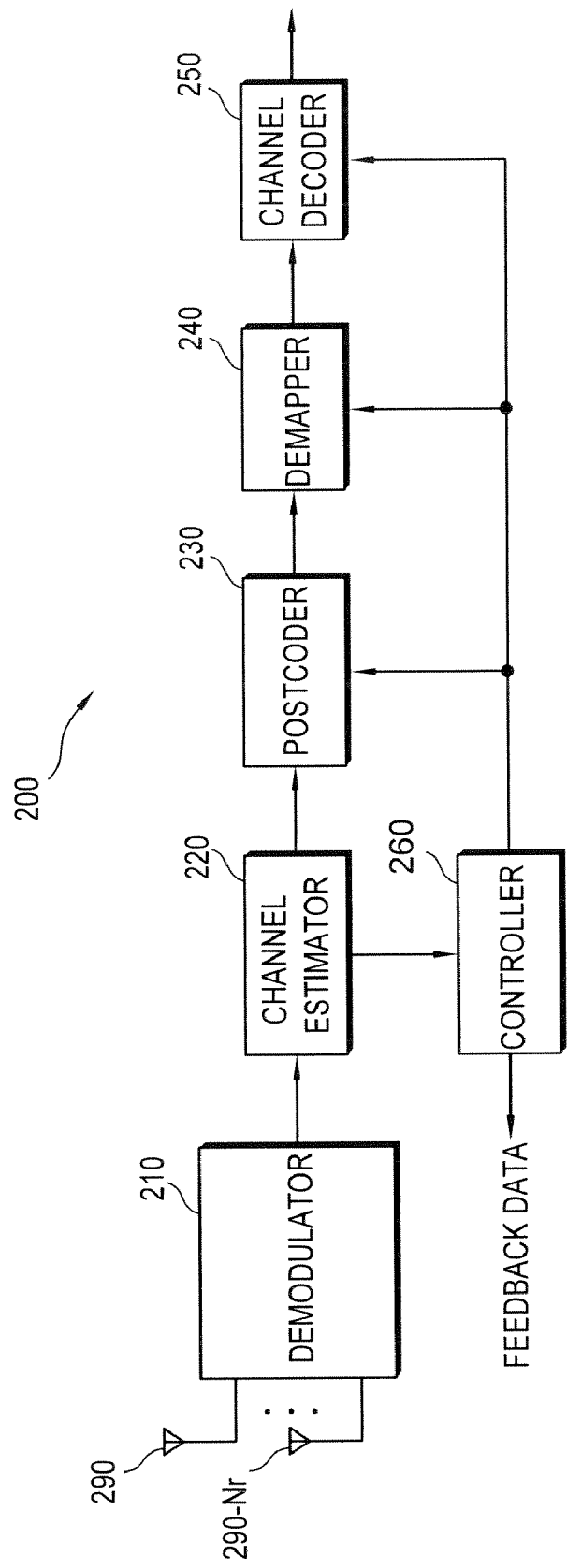
FIG. 3 is a block diagram showing a receiver having multiple antennas.

FIG. 3 is a block diagram showing a receiver having multiple antennas.

Referring to FIG. 3, a receiver 200 includes a demodulator 210, a channel estimator 220, a post-coder 230, a demapper 240, a channel decoder 250, and a controller 260. Further, the receiver 200 includes Nr (Nr>1) Rx antennas 290-1 to 290-Nr. The receiver 200 may be a part of a UE in downlink. The receiver 200 may be a part of a BS in uplink.

Signals received from the Rx antennas 290-1 to 290-Nr are demodulated by the demodulator 210. The channel estimator 220 estimates a channel. The post-coder 230 performs post-coding corresponding to the pre-coding of the precoders 140-1 to 140-K. The demapper 240 de-maps input symbols into coded data. The channel decoder 250 decodes the coded data to restore original data. The controller 260 feeds back feedback data to a transmitter. The feedback data includes channel state information (CSI), channel quality information (CQI), user priority information, etc.

Figure 4:
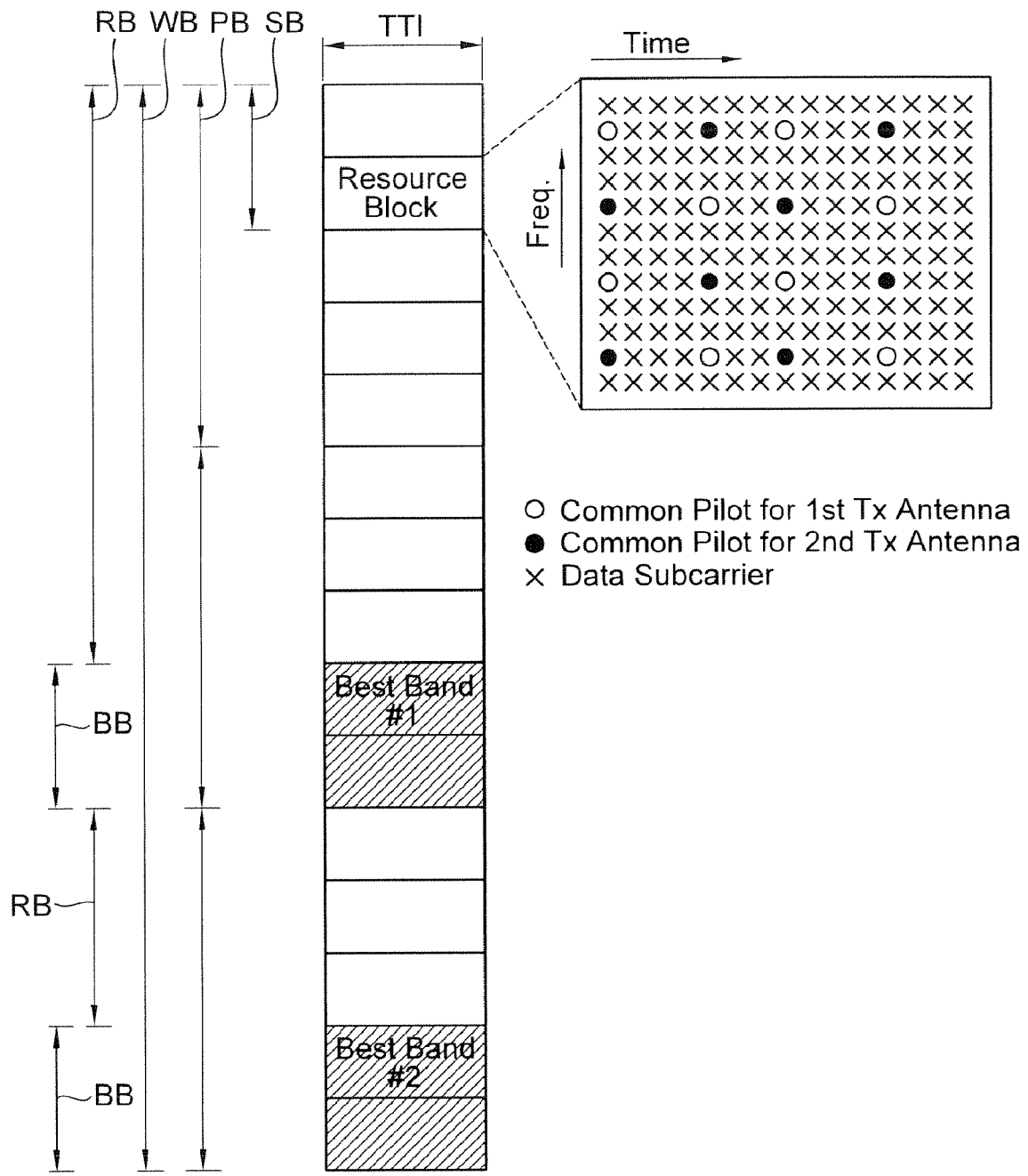
FIG. 4 shows an example of a granularity of a radio resource according to an embodiment of the present invention.

FIG. 4 shows an example of a granularity of a radio resource according to an embodiment of the present invention.

Referring to FIG. 4, user data and control signals are carried and transmitted on a frame including a plurality of resource blocks. The frame can include a plurality of OFDM symbols in a time axis and a plurality of resource blocks in a frequency axis. The resource block is a basic unit of radio resource allocation, and includes a plurality of contiguous subcarriers. The resource block can include 12 subcarriers. The subcarrier includes a data subcarrier and a pilot subcarrier. The data subcarrier can carry the user data and the control signals. The pilot subcarrier can carry common pilots for respective antennas in the multiple antenna system. The subcarrier and the pilot subcarrier can be arranged in various patterns in the resource block.

The radio resource can be divided in the frequency domain into a variety of granularities, e.g., a whole-band (WB), a PMI-band (PB), a sub-band (SB), etc. The SB denotes a frequency band for carrying at least one control signal or user data. The SB can include at least one resource block. The PB includes at least one SB. The PB includes SBs having the same or similar PMIs. The WB denotes a whole frequency band. A size relation of these bands may be SB≤PB≤WB.

According to feedback data reporting, the radio resource can be divided in the frequency domain into a best band (BB) and a residual band (RB). The BB denotes a set of specific SBs selected from a plurality of SBs. The RB denotes a set of SBs remaining after excluding BBs from the WB. For example, if CQIs are transmitted using a best-M scheme (M=2), two SBs having greatest CQI values are selected from all SB CQI values. The selected two SBs are used as BBs, and the remaining SBs are used as RBs. The CQIs of the two BBs may be transmitted without alteration, and the CQIs of the RBs may be transmitted in such as manner that CQIs of all SBs corresponding to the RBs are averaged so that the resultant one average value is transmitted. Alternatively, the CQIs of the two BBs may be averaged so that the resultant average value is transmitted, and the CQIs of all SBs corresponding to RBs may be averaged so that the resultant average value is transmitted.

The best-M scheme is for selecting a set of specific M SBs from a plurality of SBs. In the best-M scheme, a user equipment (UE) can select a most preferred SB and report the selected SB to a base station (BS). In the best-M scheme, a CQI of the selected SB can be represented with its original value or may be represented with an average value. A CQI of the RB can be represented with an average RB CQI or an average WB CQI.

The aforementioned frame structure and the granularity of the radio resource are provided for exemplary purposes only. Thus, a size of each band and the number of bands may be variously modified and applied.

The reason of applying a variety of granularities is to reduce an overhead caused by feedback data and to effectively transmit the feedback data. For example, to provide a service with good quality of service (QoS) to a plurality of UEs, it is effective to obtain and transmit CQIs for all SBs. However, since transmission of the CQIs of all SBs results in increase in the overhead, the UE transmits the CQIs in such as manner that, as for BBs, some SBs having good CQIs are specified as the BBs and their original CQIs are transmitted, whereas, as for RBs, only an average value obtained by averaging the CQIs of the RBs is transmitted.

The PMI is information required for performing precoding and postcoding on user data. The PMI can be obtained with respect to the SB, the PB, and the WB. The CQI is calculated based on the PMI and is then quantized. For correct CQI reporting, PMIs for all SBs have to be transmitted. However, transmission of the PMIs of all SBs results in increase in an overhead. An unnecessary overhead can be generated according to a size of the PB even in a case where a PMI for the PB is obtained and transmitted. When the PMI is obtained and transmitted in the same manner as a CQI transmission method, the unnecessary overhead can be reduced and correct CQI reporting can be achieved. One CQI and one PMI can be obtained and transmitted for the WB. The PB may have an equal or greater size than the BB. A PMI of the PB belonging to the BB can be transmitted together with a CQI of the BB.

The RI denotes respective independent channels that can be multiplexed by multiple antennas. The RI can be obtained and transmitted in a WB unit.

Now, a method for transmitting feedback data in a multiple antenna system will be described.

Figure 5:
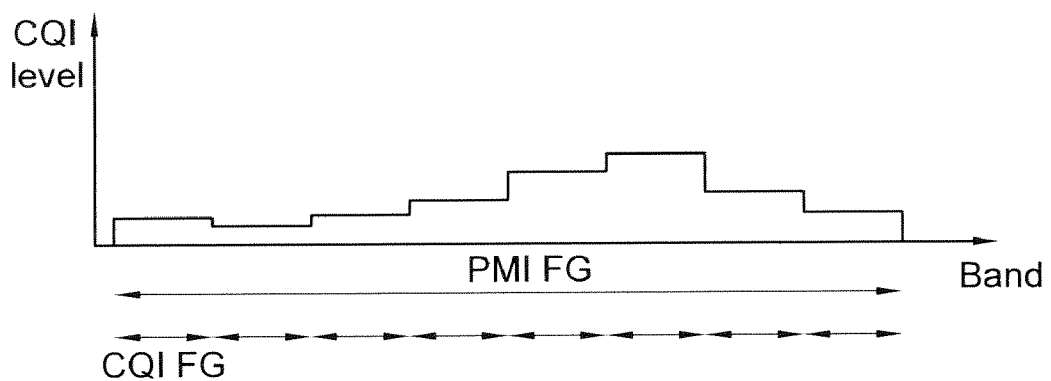
FIG. 5 shows an example of transmitting a channel quality indicator (CQI) and a precoding matrix indicator (PMI).
Figure 6:
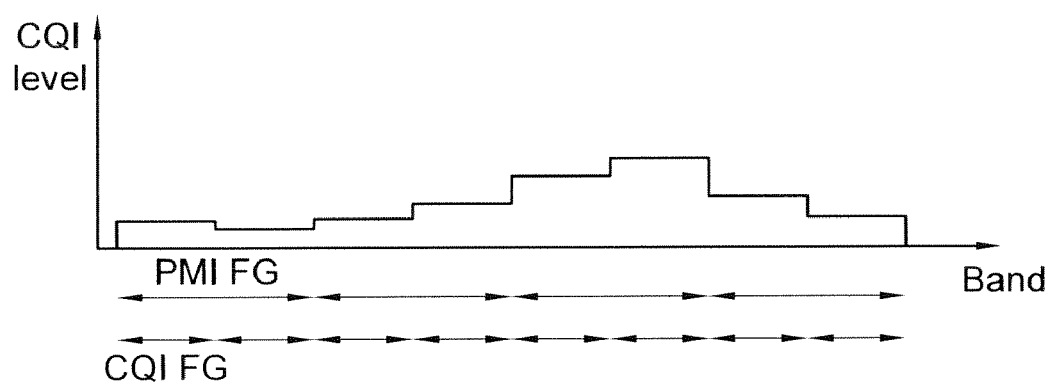
FIG. 6 shows another example of transmitting a CQI and a PMI.
Figure 7:
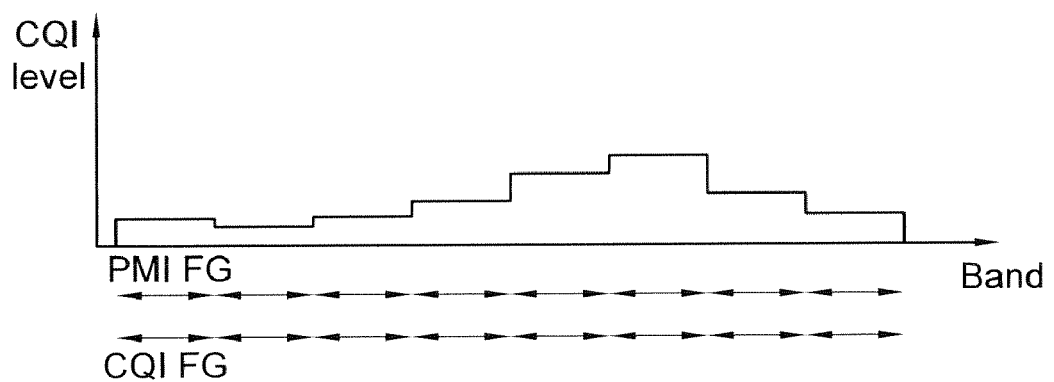
FIG. 7 shows another example of transmitting a CQI and a PMI.

FIG. 5 shows an example of transmitting a CQI and a PMI. FIG. 6 shows another example of transmitting a CQI and a PMI. FIG. 7 shows another example of transmitting a CQI and a PMI.

Referring to FIGS. 5 to 7, a whole frequency band is divided into 9 SBs.

In FIG. 5, a CQI's frequency granularity (FG) is determined to be one SB, and a PMI's FG is determined to be a WB. Feedback data may consist of CQIs of respective SBs and a CQI of the WB.

In FIG. 6, a CQI FG is determined to be one SB, and a PMI FG is determined to be greater than the CQI FG. That is, it can be related as PMI FG=N×CQI FG (N>1). The PMI FG may be determined to be a multiple of the CQI FG. For example, if two resource blocks are included in the CQI FG, the number of resource blocks included in the PMI FG can be 4, 6, ..., n, where n is a multiple of 2. Once the PMI FG is determined to be a multiple of the CQI FG, it is easy to calculate a CQI determined according to the PMI. In addition, the PMI can be easily applied. Feedback data may consist of CQIs of all SBs and a PMI of a PMI FG.

In FIG. 7, a CQI FG is determined to be one SB, and a PMI FG is also determined to be one SB. That is, the CQI FG and the PMI FG can be determined to have the same size. Feedback data may consist of CQIs and PMIs of all SBs. When the CQI FG and the PMI FG are determined to have the same size, accuracy of CQI reporting can increase. However, the number of PMIs may increase in proportion to the number of transmitted CQIs. Thus, an overhead caused by the feedback data may also increase.

CQIs can be calculated in various manners as follows.

1. A CQI for each SB can be calculated by using a PMI for each SB. The PMI for each SB is referred to as a frequency selective PMI. The CQI for each SB is referred to as a frequency selective CQI.

2. The CQI for each SB can be calculated by using a PMI for a WB.

3. The CQI for each SB belonging to an RB can be calculated by using a PMI for the RB remaining after excluding a BB selected according to the best-M scheme. A PMI for the WB or a PMI for the RB is referred to as a frequency flat PMI.

4. A CQI for each SB belonging to the BB can be calculated by applying the frequency selective PMI to the BB selected in the best-M scheme, and a CQI for each SB can be calculated by applying the frequency flat PMI to the SB belonging to the RB.

5. An average CQI for a WB can be calculated in the best-M scheme by using a CQI value in consideration of a BB. An average CQI for a WB or an RB is referred to as a frequency flat CQI.

6. An average CQI for an RB in the best-M scheme can be calculated by using a CQI value without consideration of the BB.

7. A BB CQI can be represented with a difference value with respect to a WB CQI in the best-M scheme, and an average CQI can be calculated using the RB and the difference value. The CQI average can be used as a CQI average for the RB or the WB.

When a CQI applied with the frequency selective PMI is included in CQI calculation, the average CQI can be increased as a whole. When the number of UEs is small, the RB other than the reported BB may also be allocated to the UEs. Since an RB CQI is reported to be a great value, a high MCS level can be selected and thus throughput can be improved.

Figure 8:
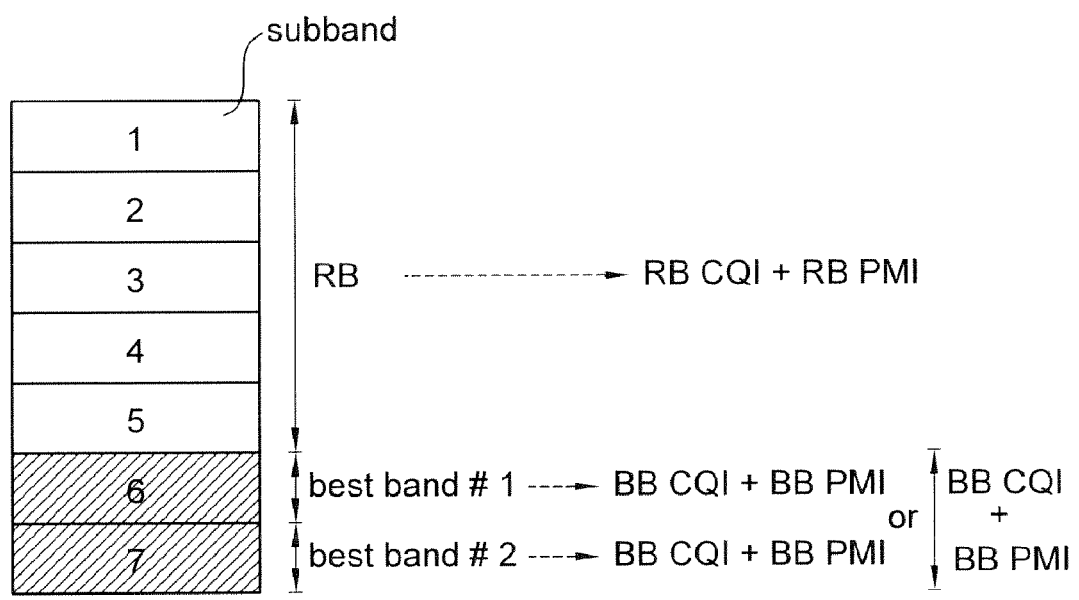
FIG. 8 shows a method for generating feedback data according to an embodiment of the present invention.

FIG. 8 shows a method for generating feedback data according to an embodiment of the present invention.

Referring to FIG. 8, a WB is divided into a plurality of SBs. A UE can obtain a CQI for each SB. The WB includes 7 SBs. It is assumed herein that a $6^{th}$ SB and a $7^{th}$ SB are BBs selected from the 7 SBs. That is, two SBs having greatest CQI values are selected in the best-M scheme (M=2). The number of the selected SBs is provided for exemplary purposes only, and thus the present invention is not limited to the aforementioned number.

Feedback data includes various types of control signals. Table 1 below shows an example of the types of control signals.

TABLE 1

| Type | bitmap | RI | CQI | PMI |
|------|--------|----|----|-----|
| A | o | WB | BB #1 CQI<br>BB #2 CQI<br>RB CQI | BB #1 PMI<br>BB #2 PMI<br>RB PMI |

TABLE 1-continued

| Type | bitmap | RI | CQI | PMI |
|------|--------|----|----|-----|
| B | o | WB | BB #1 and #2 average CQI<br>RB CQI | BB #1 PMI and BB #2 PMI<br>RB PMI |
| A-1 | o | WB | BB #1 CQI<br>BB #2 CQI | BB #1 and #2 PMI<br>RB PMI |
| B-1 | o | WB | BB #1 and #2 average CQI<br>RB CQI | BB #1 and #2 PMI<br>RB PMI |

In Table 1 above, 'bitmap' is an indicator for specifying an SB selected from a plurality of SBs. M SBs may be selected and specified with a bitmap in the best-M scheme. For example, 7 SBs can be represented with a 7-bit bitmap, and a $6^{th}$ SB and a $7^{th}$ SB selected from the 7 SBs can be specified as '0000011'. When N BB CQIs selected from N SBs are transmitted or when a WB CQI is transmitted in the best-M scheme, a bitmap may not be transmitted.

'RI' is provided for the WB and may be included in the feedback data.

'CQI' is provided for each SB selected as a BB and is also provided for a BB or an RB. The CQI may be included in the feedback data.

'PMI' is provided for each SB selected as a BB and is also provided for a value for a BB or an RB. The PMI may be included in the feedback data.

It is assumed that 'CQI' and 'PMI' are included in the feedback data with the same granularity. In the best-M scheme, the feedback data may include a BB CQI or an RB CQI. The feedback data may include a BB PMI or an RB PMI. The BB CQI may be a CQI for each SB belonging to the BB or may be one average CQI for BBs. The RB CQI may be an average CQI of SBs belonging to the RB. The BB PMI may be a PMI of each SB belonging to the BB or may be one PMI for BBs.

In Type 'A', a CQI includes a first BB (BB #1) CQI, a second BB (BB #2) CQI, and an RB CQI. A PMI includes a BB #1 PMI, a BB #2 PMI, and an RB PMI.

In Type 'B', a CQI includes an average CQI of BB #1 and BB #2 and an RB CQI. A PMI includes a BB #1 PMI, a BB #2 PMI, and an RB PMI.

In Type 'A-1', a CQI includes a BB #1 CQI and a BB #2 CQI. A PMI includes one PMI for both BB #1 and BB #2 and an RB PMI.

In Type 'B-1', a CQI includes an average CQI of BB #1 and BB #2 and an RB CQI. A PMI includes one PMI for both BB #1 and BB #2 and an RB PMI.

Figure 9:
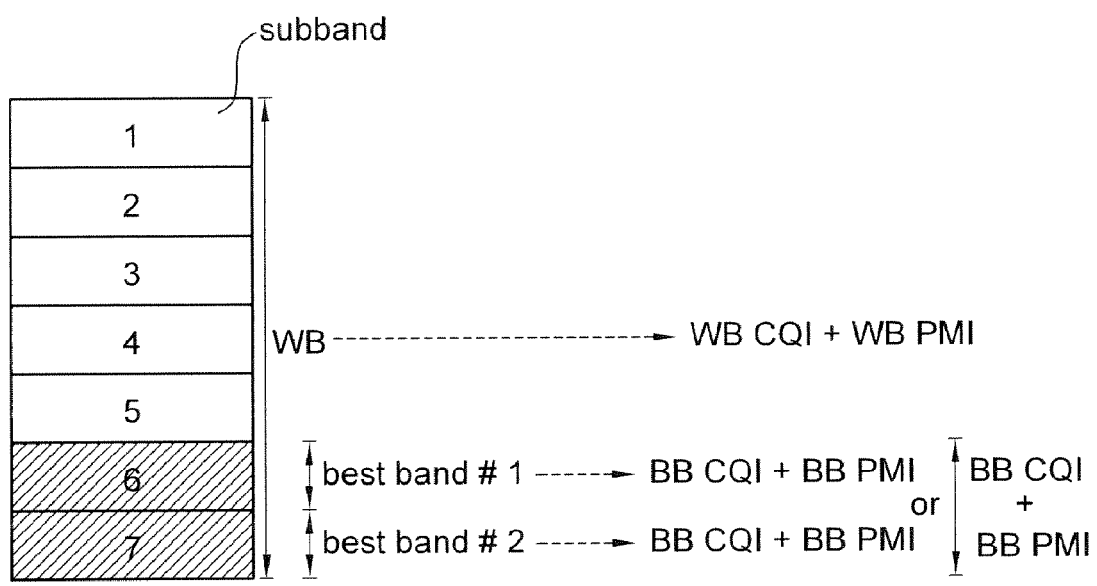
FIG. 9 shows a method for generating feedback data according to another embodiment of the present invention.

FIG. 9 shows a method for generating feedback data according to another embodiment of the present invention.

Referring to FIG. 9, a WB includes 7 SBs. It is assumed herein that a $6^{th}$ SB and a $7^{th}$ SB are BBs selected from the 7 SBs. That is, two SBs having greatest CQIs are selected in the best-M scheme (M=2).

Table 2 below shows an example of various types of feedback data.

TABLE 2

| Type | Bitmap | RI | CQI | PMI |
|------|--------|----|----|-----|
| C | o | WB | BB #1 CQI<br>BB #2 CQI<br>WB CQI | BB #1 PMI<br>BB #2 PMI<br>WB PMI |
| D | o | WB | BB #1 and #2 average CQI<br>WB CQI | BB #1 PMI and BB #2 PMI<br>WB PMI |

TABLE 2-continued

| Type | Bitmap | RI | CQI | PMI |
|---|---|---|---|---|
| C-1 | ○ | WB | BB #1 CQI<br>BB #2 CQI | BB #1 and #2 PMI<br>WB PMI |
| D-1 | ○ | WB | BB #1 and #2<br>average CQI<br>WB CQI | BB #1 and #2 PMI<br>WB PMI |

In the best-M scheme, the feedback data can include a BB CQI and a WB CQI. The feedback data can also include a BB PMI and a WB PMI. The BB CQI may be CQIs of all SBs belonging to the BB or may be one average BB CQI. The WB CQI may be an average WB CQI. The BB PMI may be PMIs of all SBs belonging to the BB or may be one PMI for BBs.

In Type 'C', a CQI includes a BB #1 CQI, a BB #2 CQI, and a WB CQI. A PMI includes a BB #1 PMI, a BB #2 PMI, and a WB PMI.

In Type 'D', a CQI includes an average CQI of BB #1 and BB #2 CQI and a WB CQI. A PMI includes a BB #1 PMI, a BB #2 PMI, and a WB PMI.

In Type 'C-1', a CQI includes a BB #1 CQI and a BB #2 CQI. A PMI includes one PMI for BBs #1 and #2 and a WB PMI.

In Type 'D-1', a CQI includes an average CQI of BB #1 and BB #1 and a WB CQI. A PMI includes one PMI for BBs #1 and #2 and a WB PMI. A user equipment (UE) selects M SBs from a plurality of SBs, and reports to a base station (BS) one PMI and one CQI for the selected SBs (i.e., BBs). Herein, one PMI for the selected M SBs indicates an index of one precoding matrix selected from a codebook set used when transmission is made through the selected M SBs. One CQI for the selected M SBs uses the precoding matrix used in the selected M SBs. A difference value with respect to the WB CQI can be used as a CQI value for the selected M SBs. The UE reports to the BS a WB PMI and a WB CQI for a WB including a plurality of SBs. The WB PMI indicates an index of a precoding matrix selected from a codebook for all of the plurality of SBs. The WB CQI indicates a CQI value for all of the plurality of SBs.

The types of control signals described in Table 1 and Table 2 above can be used in combination with each other. For example, CQIs transmitted through the feedback data may be the average BB CQI and the WB CQI, and PMIs transmitted through the feedback data may be the BB PMI and the RB PMI.

A scheme for transmitting the WB PMI or the RB PMI is referred to as a PMI compression scheme.

As described above, when a CQI is obtained for an SB in transmission, a PMI is obtained for the same SB and is then transmitted. In addition, when one CQI is obtained for an RB or a WB in transmission, one PMI is obtained for the RB and the WB and is then transmitted. The UE transmits the CQI and the PMI by using the same granularity value, thereby reducing an overhead caused by feedback data.

The aforementioned description is for exemplary purposes only, and thus the present invention is not limited thereto. For example, only a BB CQI may be transmitted without transmitting a WB CQI or an RB CQI, and as a result, only a BB PMI may be transmitted.

Table 3 blow shows another example of various types of feedback data. This is a case where only an SB CQI and an SB PMI are transmitted.

TABLE 3

| Type | Bitmap | RI | CQI | PMI |
|---|---|---|---|---|
| E | ○ | WB | BB #1 CQI<br>BB #2 CQI | All of SB PMI/<br>WB PMI |
| F | ○ | WB | BB #1 CQI<br>BB #2 CQI | BB #1 PMI<br>BB #2 PMI |
| G | ○ | WB | BB #1 CQI<br>BB #2 CQI | BB #1 and #2 PMI |
| H | ○ | WB | BB #1 and #2<br>average CQI | BB #1 and #2 PMI |

In Type 'E', a CQI includes a BB #1 CQI and a BB #2 CQI. A PMI includes all of each SB PMIs or a WB PMI.

In Type 'F', a CQI includes a BB #1 CQI and a BB #2 CQI. A PMI includes a BB #1 PMI and a BB #2 PMI.

In Type 'G', a CQI includes a BB #1 CQI and a BB #2 CQI. A PMI includes one PMI for both BB #1 and BB #2.

In Type 'H', a CQI includes an average CQI for both BB #1 and BB #2. A PMI includes one PMI for both BB #1 and BB #2.

Table 4 below shows another example of various types of feedback data. This is a case where only a WB CQI and a WB PMI are transmitted.

TABLE 4

| Type | Bitmap | RI | CQI | PMI |
|---|---|---|---|---|
| I | x | WB | WB CQI | WB PMI |
| J | x | x | WB CQI | WB PMI |

Since the WB CQI and the WB PMI are transmitted, bitmap information is not required.

In Type 'I', a CQI is a WB CQI, and a PMI is a WB PMI. In Type 'J', rank information is not given. A CQI is a WB CQI, and a PMI is a WB PMI.

A granularity of a PMI-band (PB) can be determined variously according to a type of feedback data.

A PB may have the same granularity as an SB or may have a granularity greater than the SB and less than a WB. The PB may be variable. The granularity of the PB can be determined as follows.

(1) Smallest PMI Band (S-PB)

The PB has the same granularity as the SB (i.e., PB=SB): (a) The granularity of the PB can be determined to be the same granularity as SBs for M CQIs.

(2) Middle PMI Band; (M-PB)

The PB has a granularity greater by an integer multiple number than the SB (i.e., SB<PB<WB): (a) The granularity of the PB can be determined to have the size of contiguous SBs for M CQIs; (b) When M average CQIs are transmitted, M SBs can be determined as the PB; and (c) (N−M) SBs which are non-selected bands among N SBs can be determined as the PB.

(3) Largest PMI Band (L-PB)

The PB has the same granularity as the WB (i.e., PB=WB): (a) The granularity of the PB can be determined to have the same granularity as the WB.

Now, a granularity of a PB according to a reporting type of feedback data will be described.

If the reporting type of feedback data is 'A' or 'B' of Table 1 above, the granularity of the PB for an SB CQI can be S-PB, M-PB(a), or M-PB(b). The granularity of the PB for an RB CQI can be M-PB(c).

If the reporting type of feedback data is 'C' or 'D' of Table 2 above, the granularity of the PB for the SB CQI can be S-PB, M-PB(a), or M-PB(b). The granularity of the PB for a WB CQI can be M-PB(c) or L-PB. In addition, when the number M of selected bands is equal to the number N of all SBs, the granularity of the PB for the SB CQI can be S-PB, and the granularity of the PB for an average WB CQI can be L-PB.

If the reporting type of feedback data is 'E', 'F', 'G', or 'H' of Table 3 above, the granularity of the PB for the SB CQI can be S-PB, M-PB(a), or M-PB(b). Further, the granularity of the PB for the WB can be M-PB(c) or L-PB.

If the reporting type of feedback data is 'I' or 'J' of Table 4 above, the granularity of the PB for the WB CQI can be L-PB.

Figure 10:
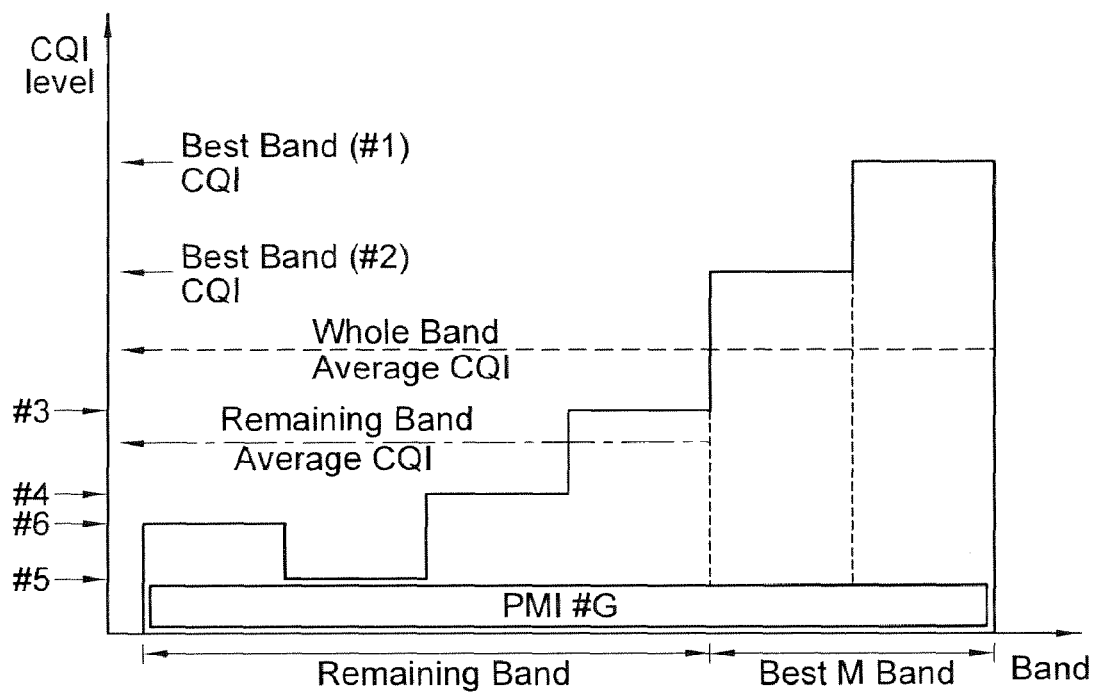
FIG. 10 shows a method for transmitting feedback data according to an embodiment of the present invention.
Figure 11:
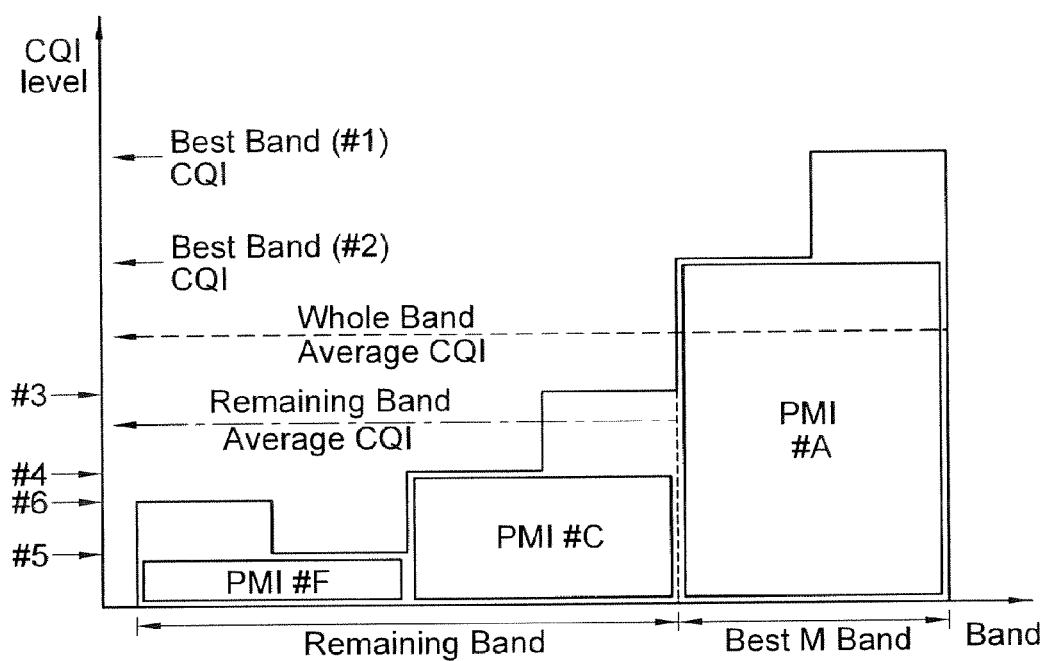
FIG. 11 shows a method for transmitting feedback data according to another embodiment of the present invention.
Figure 12:
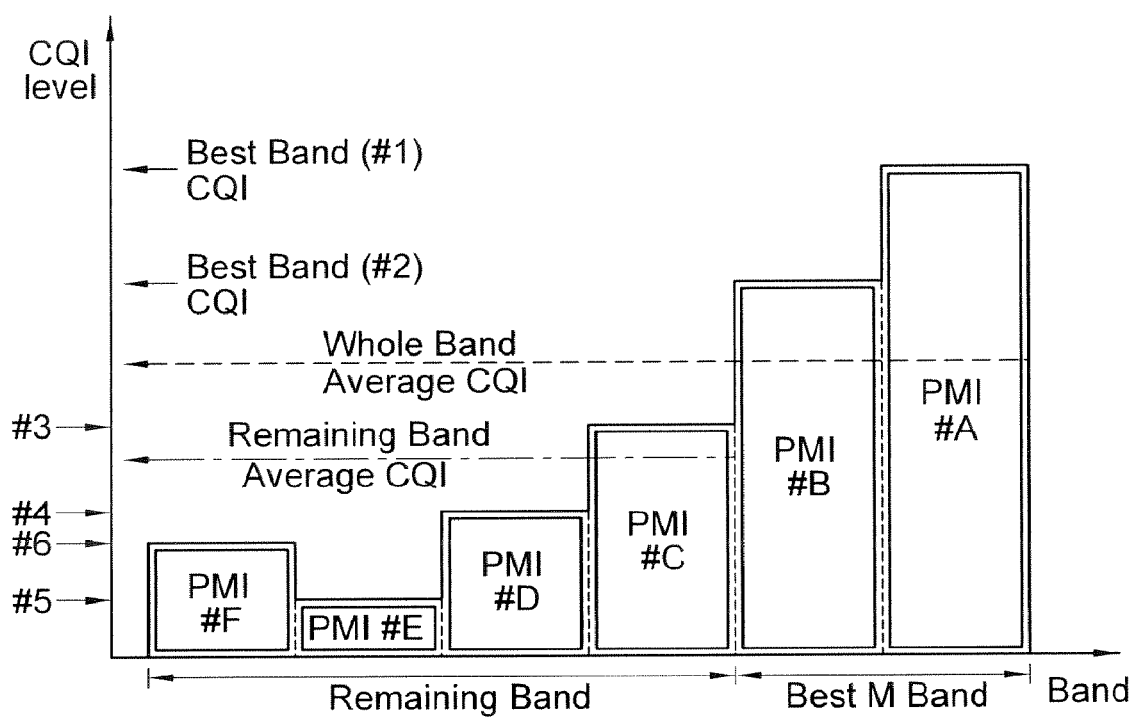
FIG. 12 shows a method for transmitting feedback data according to another embodiment of the present invention.

FIGS. 10 to 12 show a method for transmitting feedback data according to an embodiment of the present invention. More specifically, FIG. 10 shows a case of transmitting a WB PMI, FIG. 11 shows a case of transmitting a PMI for a PMI FG having a greater size than a CQI FG, and FIG. 12 shows a case of transmitting a PMI for a PMI FG having the same size as the CQI FG.

Referring to FIGS. 10 to 12, an uplink overhead can be reduced when one PMI is transmitted for a WB. In this case, a CQI to be transmitted may include a BB (i.e., BB #1 and BB #2) CQI and a WB CQI or may include a BB CQI and an RB CQI.

When the PMI FG has a size two times higher than the CQI FG, one PMI (i.e., PMI #A) may be transmitted for the BBs #1 and #2 having greatest CQI levels, and two PMIs (i.e., PMIs #C and #F) may be transmitted for RBs #3 to #5. Although the WB PMI is transmitted in this case, the uplink overhead can be reduced when the PMI FG is determined to have a greater size than the CQI FG. When the PMI is represented in 4 bits, resources of 12 bits are used to transmit the PMI. In this case, a CQI to be transmitted may include a BB (i.e., BB #1 and BB #2) CQI and a WB CQI or may include a BB CQI and an RB CQI.

When the PMI FG and the CQI FG have the same size, the PMI #A and the PMI #B of the respective BBs #1 and #2 and the PMI #C and the PMI #F of the respective RBs #3 and #5 can be transmitted. Although data throughput can increase in this case, the uplink overhead may significantly increase. When the PMI is represented in 4 bits, resources of 24 bits are used to transmit 6 PMIs. In this case, a CQI to be transmitted may include a BB (i.e., BB #1 and BB #2 ) CQI and a WB CQI or may include a BB CQI and an RB CQI.

The aforementioned number of SBs and BBs for generating feedback data can vary variously. The size and the number of PBs also can vary variously. PMIs can be transmitted in various manners. For example, a BB PMI and a WB PMI can be transmitted, or only PMIs for some BBs selected from a plurality of BBs can be transmitted.

Now, a method for transmitting PMIs of some SBs (i.e., BBs) instead of transmitting all PMIs of a whole frequency band will be described.

Figure 13:
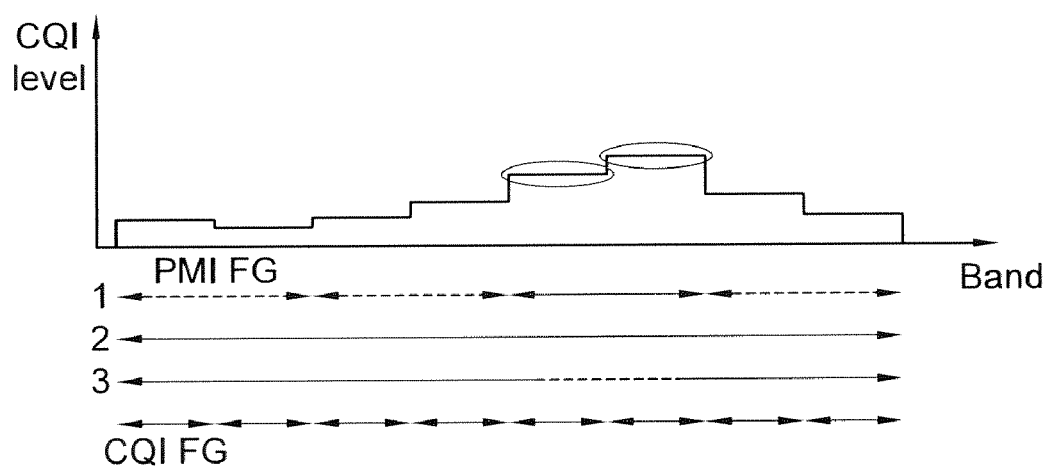
FIG. 13 shows a method for transmitting feedback data according to another embodiment of the present invention.
Figure 14:
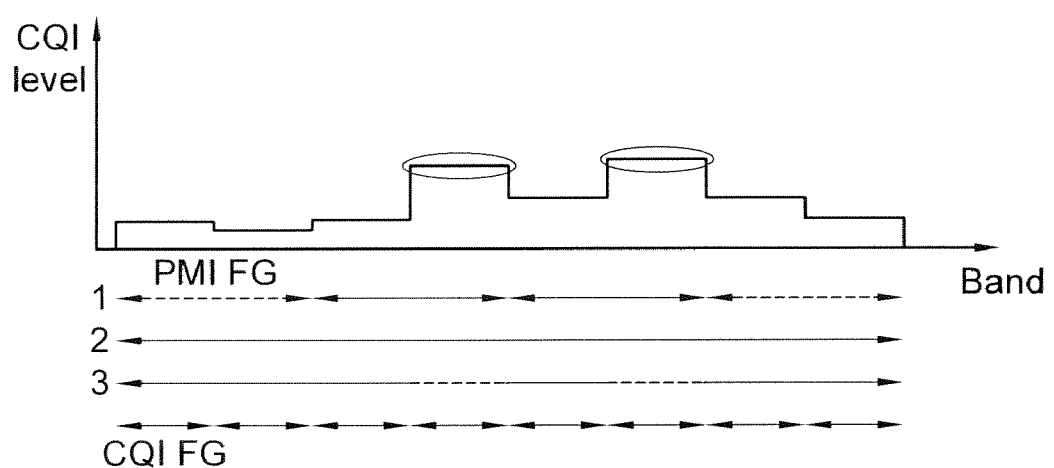
FIG. 14 shows a method for transmitting feedback data according to another embodiment of the present invention.

FIGS. 13 and 14 show a method for transmitting feedback data according to another embodiment of the present invention. This is a case where a PMI FG is greater in size than a CQI FG (i.e., PMI FG=N×CQI FG (N>1)).

Referring to FIGS. 13 and 14, a PMI of a BB having a high CQI is transmitted, and a PMI of an RB is additionally transmitted when necessary. This is referred to as a BB PMI scheme. PMIs of respective PBs belonging to the BB are transmitted, and then an RB PMI or a WB PMI can be transmitted. The number of PMIs to be transmitted by a UE may be determined according to the number of BBs and a ratio of a CQI FG to a PMI FG.

It is assumed that the PMI FG has a size two times higher than the CQI FG, and two SBs are selected as BBs (i.e., M=2). In FIG. 13, the selected BBs are included in one PMI FG. The number of PMIs to be transmitted by the UE is one. In FIG. 14, the selected two BBs are included in different PMI FGs. The number of PMIs to be transmitted by the UE is two. The UE may transmit a WB PMI(2) along with a PMI(1) of a PB belonging to the BB, or may transmit an RB PMI(3).

Figure 15:
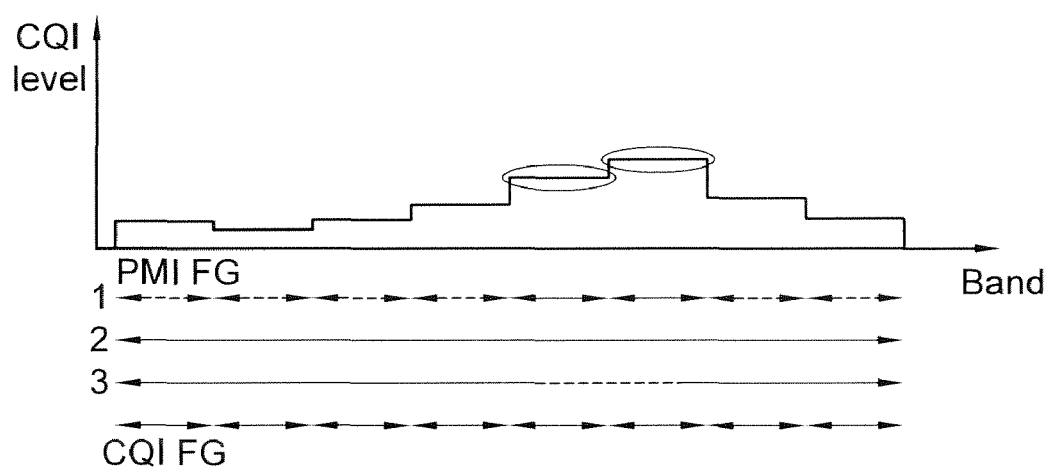
FIG. 15 shows a method for transmitting feedback data according to another embodiment of the present invention.
Figure 16:
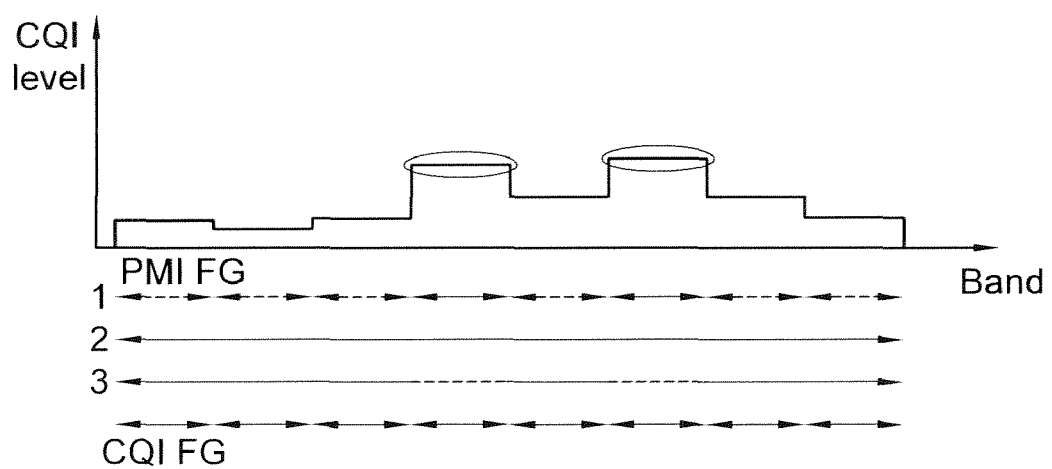
FIG. 16 shows a method for transmitting feedback data according to another embodiment of the present invention.

FIGS. 15 and 16 show a method for transmitting feedback data according to another embodiment of the present invention. This is a case where a PMI FG and a CQI FG have the same size.

Referring to FIGS. 15 and 16, when the PMI FG and the CQI FG have the same size, one PMI is assigned for one CQI. When the CQI and the PMI are reported in the best-M scheme, the CQI and the PMI can be reported with one bitmap. A UE may transmit a WB PMI(2) together with a BB PMI(1) or may transmit an RB PMI(3).

When the BB PMI is transmitted together with the WB (or RB) PMI, a band applied with each PMI can be known by using the reported CQI. For example, when the UE reports a BB CQI by selecting M BBs, the UE can report the BB PMI together with the BB CQI. In this case, an index indicating a BB in CQI reporting can also be used without alternation in PMI reporting.

Even when applying the PMI FG and the CQI FG having different sizes, a band applied with a PMI reported through the index indicating the BB can be known. The UE may report control signals, for example, $CQI_M, \ldots, CQI_M, CQI_{Average}$, BitMap, $PMI_1, \ldots, PMI_L$, and $PMI_{Average}$ (M>L). When an average PMI (i.e., $PMI_{Average}$) is located in a last position of a reported area, information on remaining PMIs other than the average PMI is sequentially used as information on BB PMIs.

Herein, "$CQI_1, \ldots, CQI_M, CQI_{Average}$, BitMap" is an expression in consideration of CQI compression of the best-M scheme. A PMI compression scheme can be used along with any CQI compression schemes. For example, if the UE compresses CQI information of each SB by using discrete cosine transform (DCT) and transmits the compressed CQI information, the BS can know each SB CQI according to compression information. Accordingly, a position of a BB can be known, and the position of the BB is a position applied with a BB PMI.

FIGS. 17 to 20 show a method for transmitting feedback data according to another embodiment of the present invention. This is a case where a PMI FG has a size two times higher than a CQI FG, and two BBs having good CQIs are selected (i.e., M=2).

Figure 17:
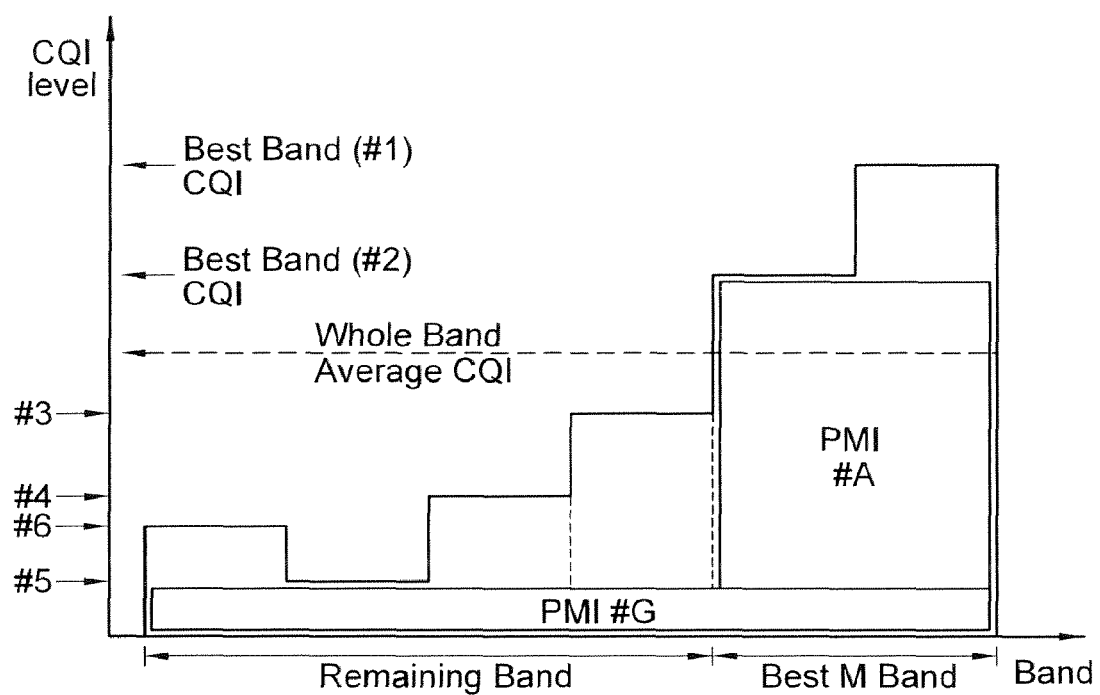
FIG. 17 shows a method for transmitting feedback data according to another embodiment of the present invention.

Referring to FIGS. 17 to 20, in FIG. 17, when BBs #1 and #2 are included in one PMI FG, a UE transmits one PMI #A for the BBs #1 and #2 and a PMI #G for a WB. In this case, the UE may transmit CQIs of the BBs #1 and #2 and an average WB CQI.

Figure 18:
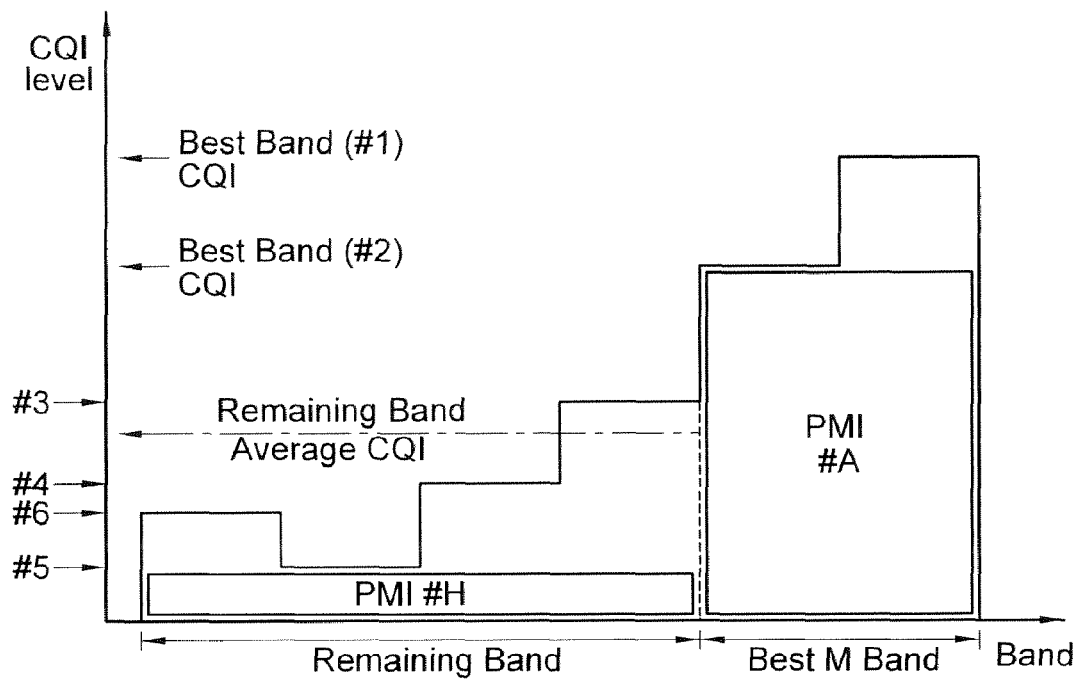
FIG. 18 shows a method for transmitting feedback data according to another embodiment of the present invention.

In FIG. 18, when the BBs #1 and #2 are included in one PMI FG, the UE transmits one PMI #A for the BBs #1 and #2 and a PMI #H for an RB. In this case, the UE may transmit CQIs of the BBs #1 and #2 and an RB CQI.

Figure 19:
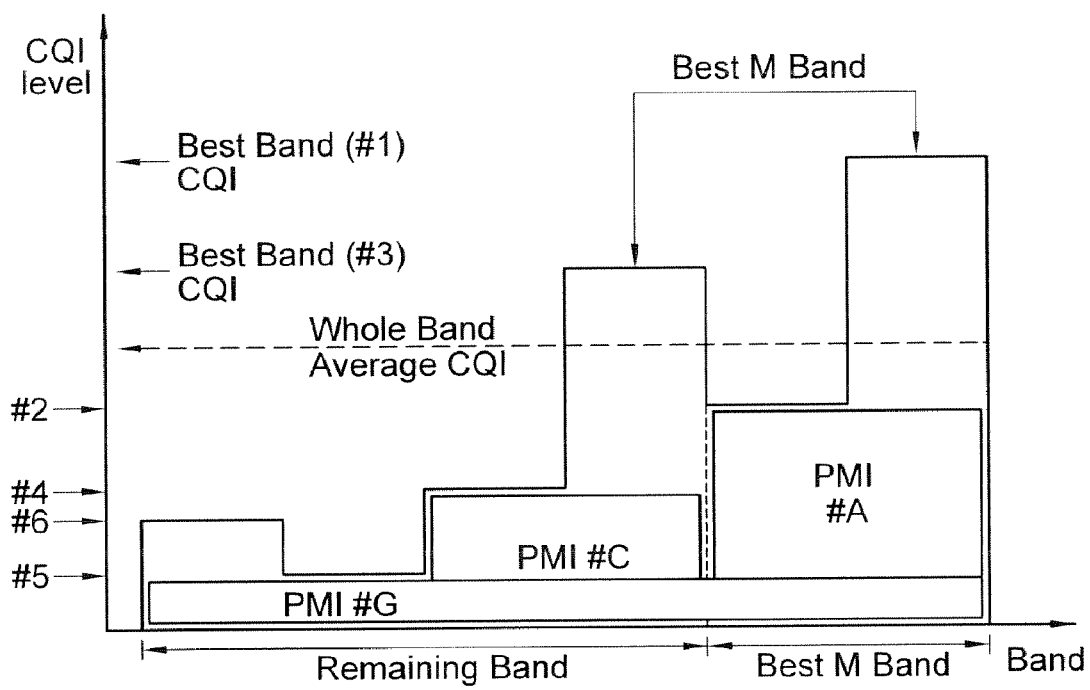
FIG. 19 shows a method for transmitting feedback data according to another embodiment of the present invention.

In FIG. 19, when the BBs #1 and #3 are included in different PMI FGs, the UE transmits PMIs #A and #C for the respective PMI FGs and a PMI #G for a WB. In this case, the UE may transmit CQIs of the BBs #1 and #3 and an average WB CQI.

Figure 20:
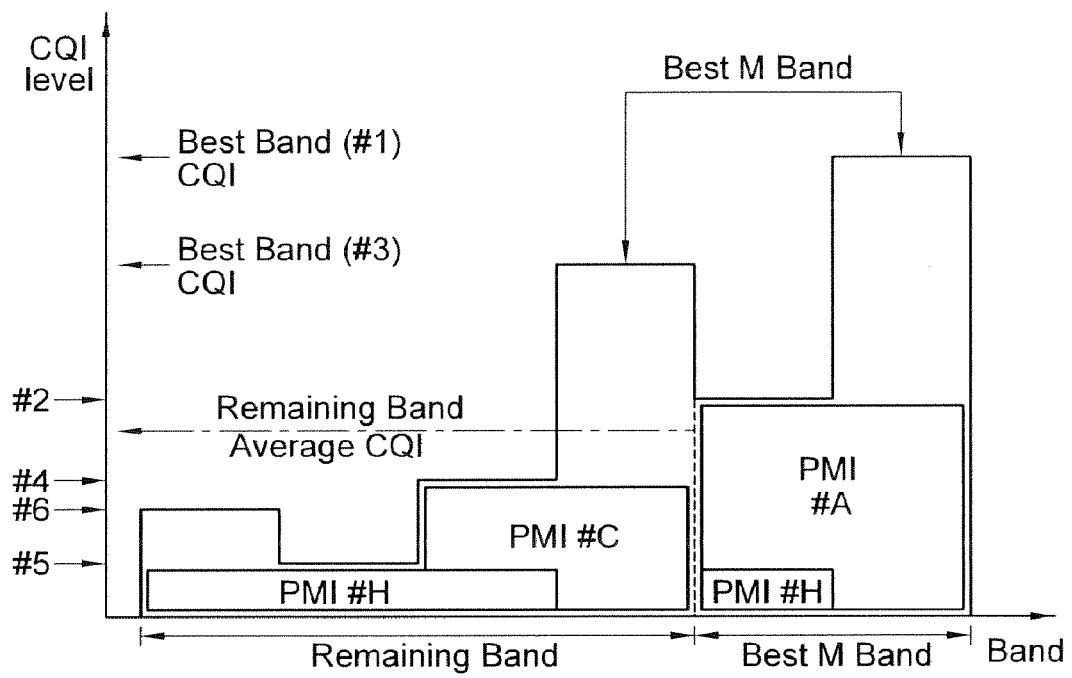
FIG. 20 shows a method for transmitting feedback data according to another embodiment of the present invention.

In FIG. 20, when the BBs #1 and #3 are included in different PMI FGs, the UE transmits PMIs #A and #C for the respective PMI FGs and a PMI #G for an RB. In this case, the UE may transmit CQIs of the BBs #1 and #3 and an RB CQI.

FIGS. 21 to 24 show a method for transmitting feedback data according to another embodiment of the present invention. This is a case where a PMI FG and a CQI FG have the same size, and two BBs having high CQIs are selected (i.e., M=2).

Figure 21:
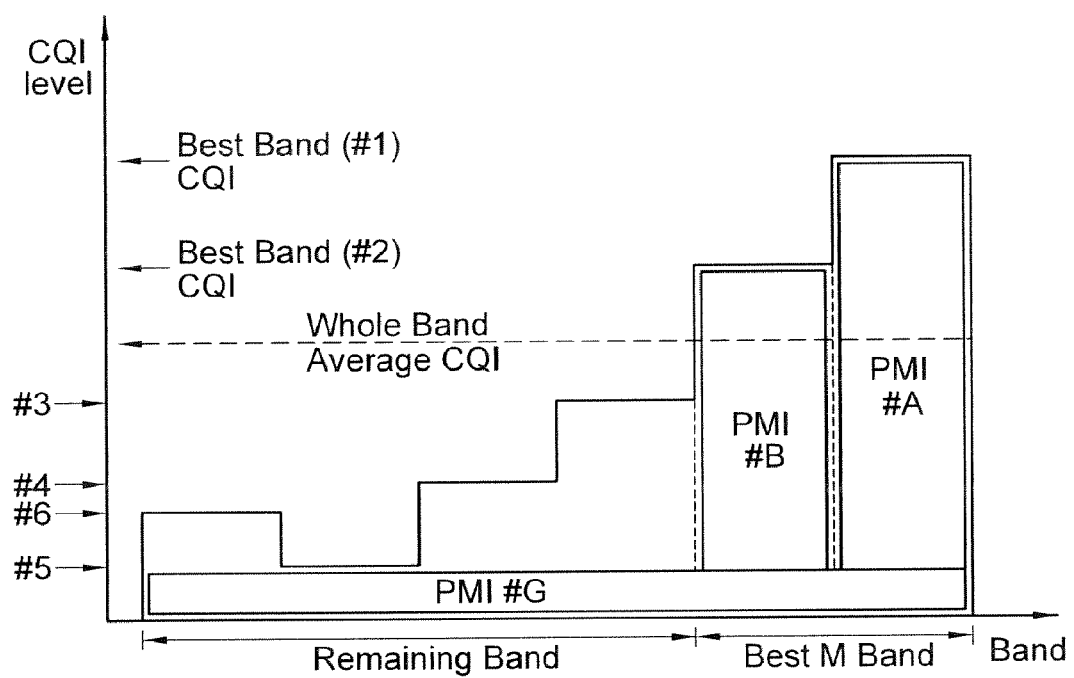
FIG. 21 shows a method for transmitting feedback data according to another embodiment of the present invention.

Referring to FIGS. 21 to 24, in FIG. 21, a UE transmits PMIs #A and #B for respective BBs #1 and #2 and a PMI #G for a WB. In this case, the UE may transmit CQIs of the BBs #1 and #2 and an average WB CQI.

Figure 22:
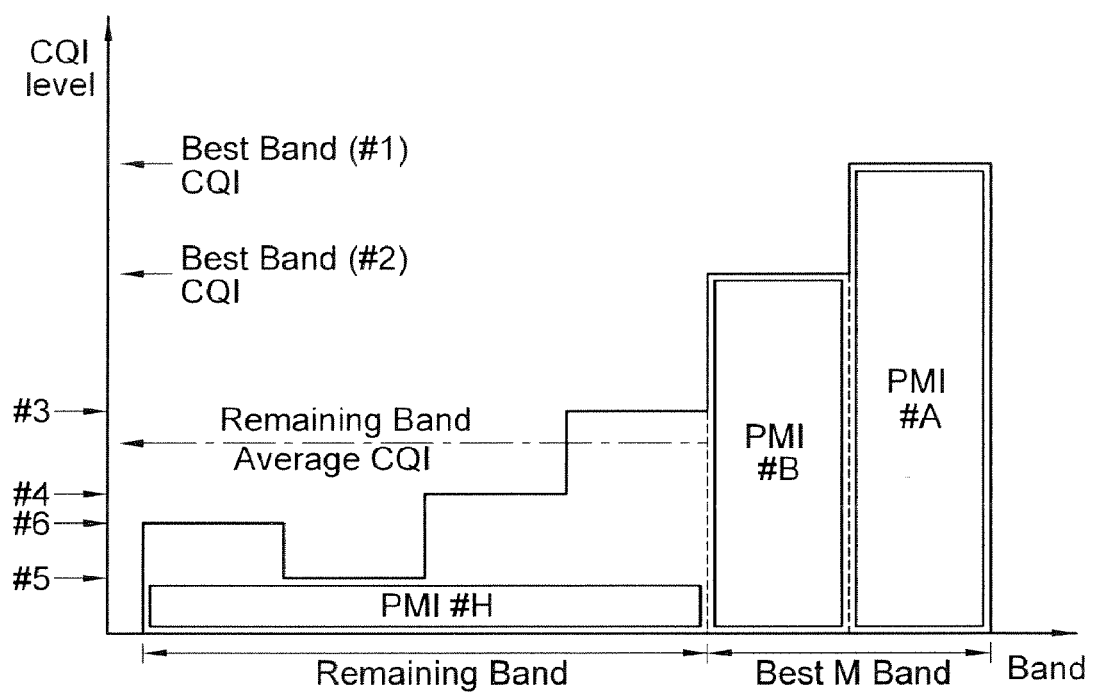
FIG. 22 shows a method for transmitting feedback data according to another embodiment of the present invention.

In FIG. 22, the UE transmits PMIs #A and #B for respective BBs #1 and #2 and a PMI #H for an RB. In this case, the UE may transmit CQIs of the BBs #1 and #2 and an RB CQI.

Figure 23:
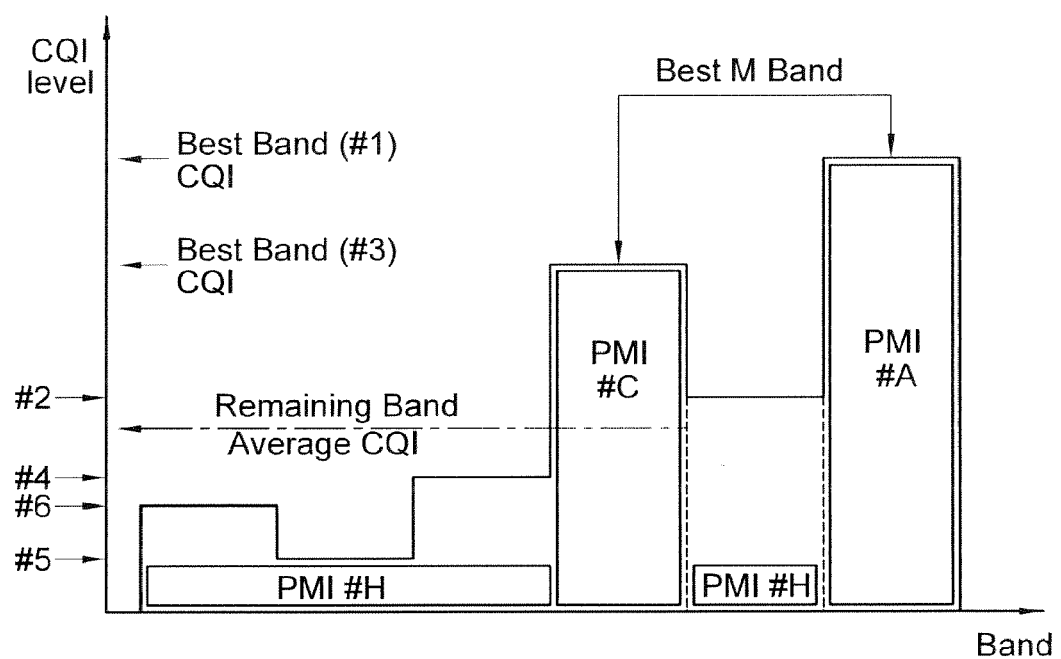
FIG. 23 shows a method for transmitting feedback data according to another embodiment of the present invention.

In FIG. 23, the PMI FG and the CQI FG have the same size even if selected BBs are not contiguous to each other. Thus, the UE can transmit PMIs #A and #C for respective BBs #1 and #3 and a PMI #H for an RB. In this case, the UE may transmit CQIs of the BBs #1 and #3 and an RB CQI.

Figure 24:
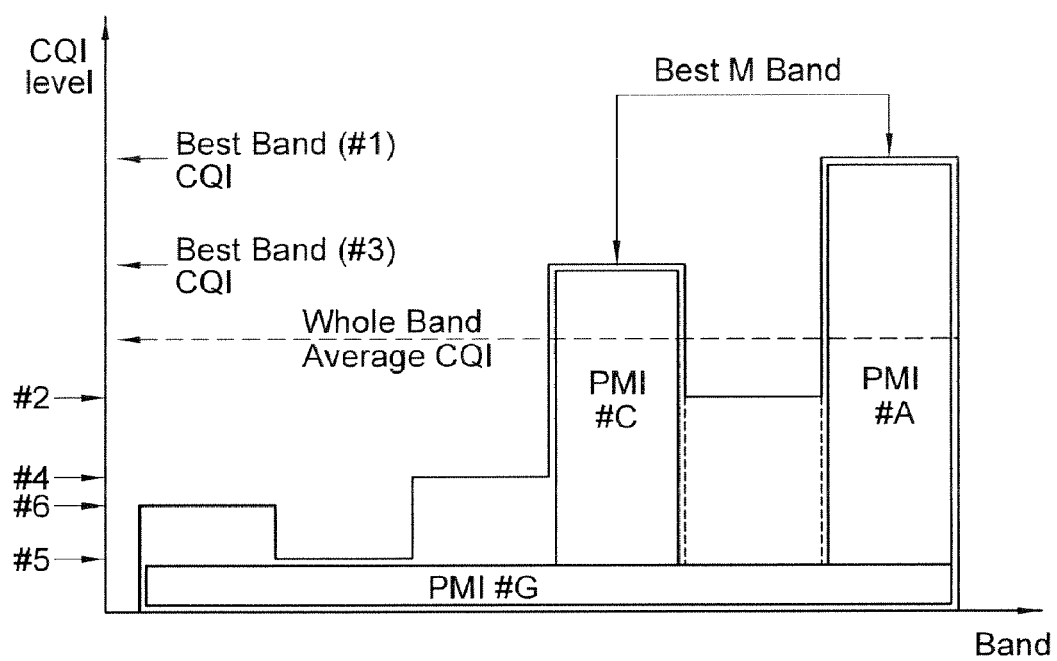
FIG. 24 shows a method for transmitting feedback data according to another embodiment of the present invention.

In FIG. 24, even if selected BBs are not contiguous to each other, the UE can transmit PMIs #A and #C for respective BBs #1 and #3 and a PMI #G for a WB. In this case, the UE may transmit CQIs of the BBs #1 and #3 and a WB CQI.

When a BB PMI and a WB PMI are transmitted or when a BB PMI and an RB PMI are transmitted, the following gain can be obtained.

1. If a CQI FG and a PMI FG have the same size, a granularity applied to a PMI is the same as that applied to a CQI. Thus, the PMI and the CQI can be easily mapped.

2. If the CQI FG and the PMI FG have different sizes, the following is applied. (1) The PMI and the CQI can be more easily mapped when the PMI FG and the CQI FG have a multiple relation than when the PMI FG and the CQI FG have a relatively prime relation. (2) It is easy to use a PMI compression scheme together with a CQI compression scheme when the PMI FG has a larger size than the CQI FG and has a multiple relation to the CQI FG. That is, a BB PMI transmission method and a BB CQI transmission method can be easily used. (3) When some of PMIs are to be transmitted, there is a need to inform which SB PMIs are transmitted. For example, selected SBs may be informed using a bitmap. Alternatively, in case of a PMI for an SB applied with a best-M CQI, the PMI can be used by searching for information indicating a position of a BB CQI.

Figure 25:
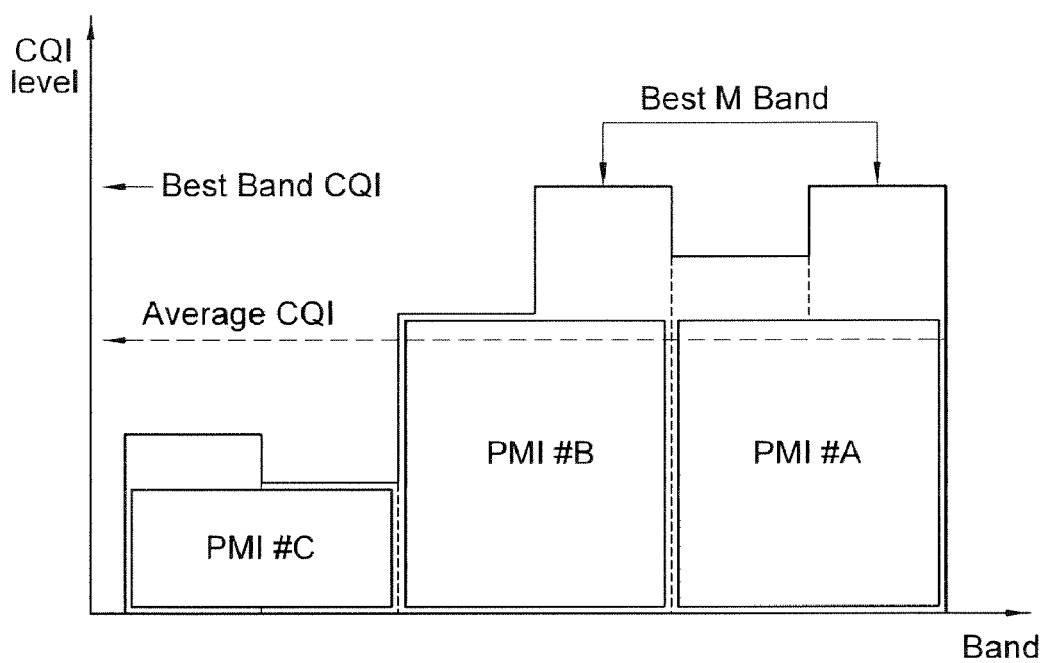
FIG. 25 shows a method for transmitting feedback data according to another embodiment of the present invention.
Figure 26:
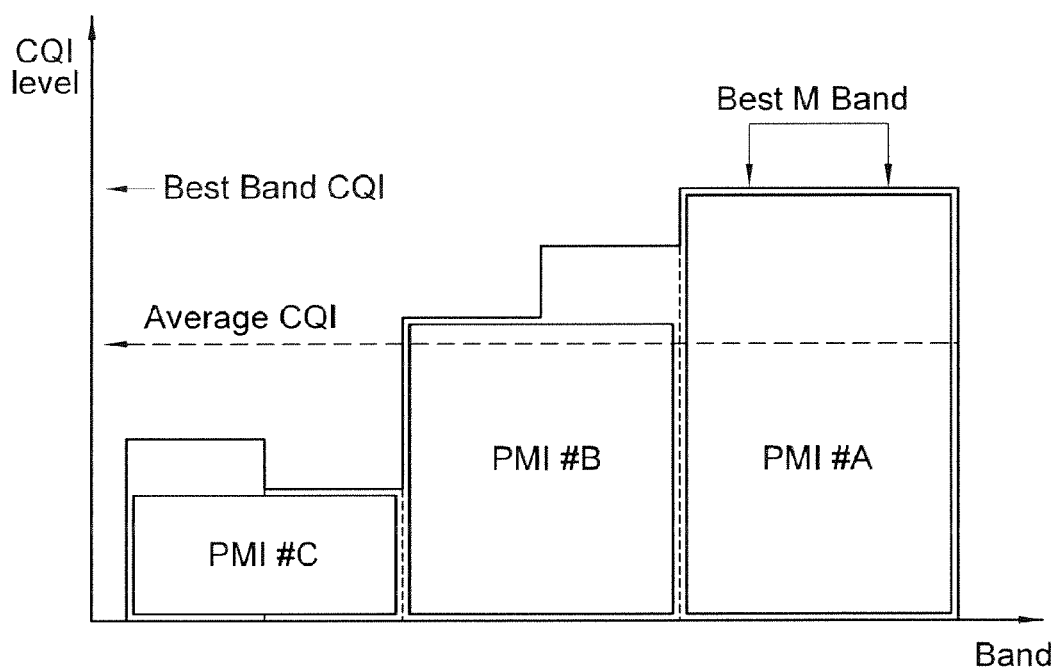
FIG. 26 shows a method for transmitting feedback data according to another embodiment of the present invention.
Figure 27:
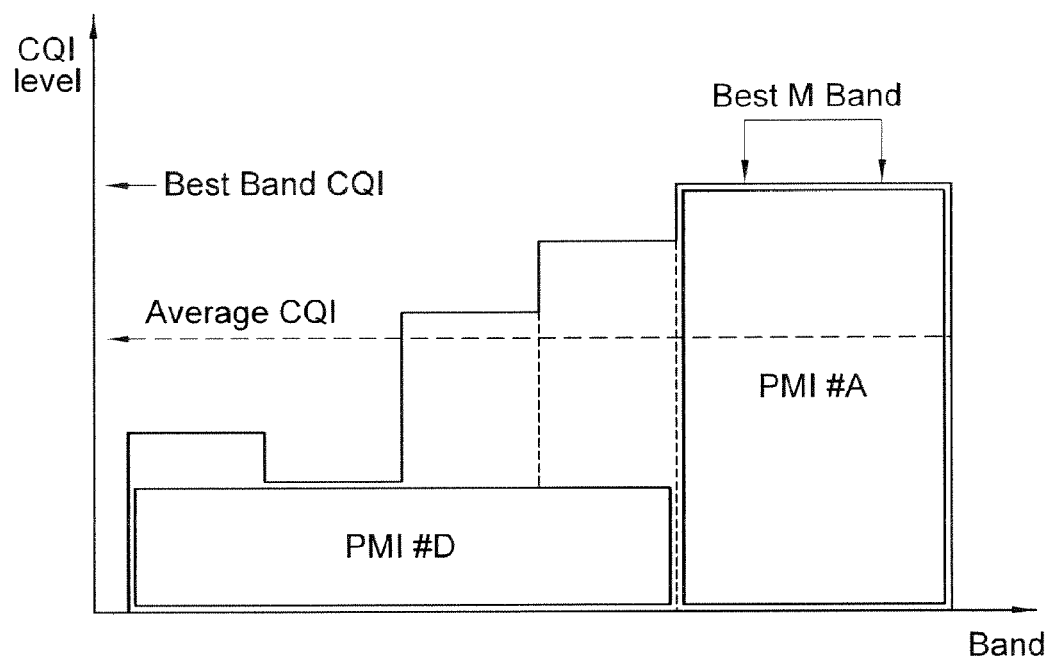
FIG. 27 shows a method for transmitting feedback data according to another embodiment of the present invention.

FIGS. 25 to 27 show a method for transmitting feedback data according to another embodiment of the present invention.

Referring to FIGS. 25 to 27, a CQI and a PMI can be transmitted by configuring a PMI FG to have a larger size than a CQI FG and by selecting contiguous BBs included in one PMI FG.

To allow the contiguous BBs to be included in one PMI FG, the following is carried out. (1) A PM I-band (PB) including an SB having a good channel condition is obtained. The PM I-band includes at least one SB and at least one CQI-band. (2) M BBs are selected from the obtained PMI-band. The BB is a CQI-band including at least one SB. (3) CQIs of the BBs selected from one PMI FG are obtained. (4) A BB CQI and a WB (or RB) CQI are transmitted. (5) A PMI of a PMI-band including the BBs and a PMI of a WB (or RB) are transmitted. The number of transmitted PMIs is determined according to a value M given in the best-M scheme. The number of reporting PMIs can be determined according to the value M as follows.

No. of reporting PMI=[M/N]

Herein, N=PMI FG/CQI FG. The PMI FG can be determined to be a multiple of the CQI FG. That is, the number of SBs belonging to the PMI-band is a multiple of the number of SBs included in the BB (i.e., CQI-band). M may be a default value or may be determined by a BS and reported to a UE. When the number of reporting PMIs is determined according to the determined M, feedback data reported by the UE to the BS can be determined in a specific format. In addition, a bitmap indicating the BB can be reused as a bitmap indicating the PMI-band. When the feedback data transmitted by the UE is determined to the specific format, the BS can avoid a complex process such as blind decoding, thereby increasing system efficiency.

In FIG. 25, PMIs #A and #B of a PMI FG corresponding to randomly selected BBs and a PMI #C of an RB are transmitted. CQIs to be transmitted include a BB CQI and a WB CQI. The WB CQI may be an average CQI for a plurality of BBs. Instead of the WB CQI, an RB CQI may be transmitted. There is no particular overhead reduction.

In FIG. 26, when contiguous BBs are selected and the selected BBs are included in one PMI FG, one PMI #A for the BBs and PMIs #B and #C for RBs can be transmitted. When only the PMIs for the BBs are transmitted, an overhead can be reduced.

In FIG. 27, when contiguous BBs are selected and the selected BBs are included in one PMI FG, one PMI #A for the BBs and a PMI #D for an RB can be transmitted. An overhead caused by PMI transmission can be further reduced. As such, when feedback data is transmitted by configuring the PMI FG to be larger than the CQI FG and by selecting contiguous BBs included in one PMI FG, an overhead caused by feedback data transmission can be reduced.

Figure 28:
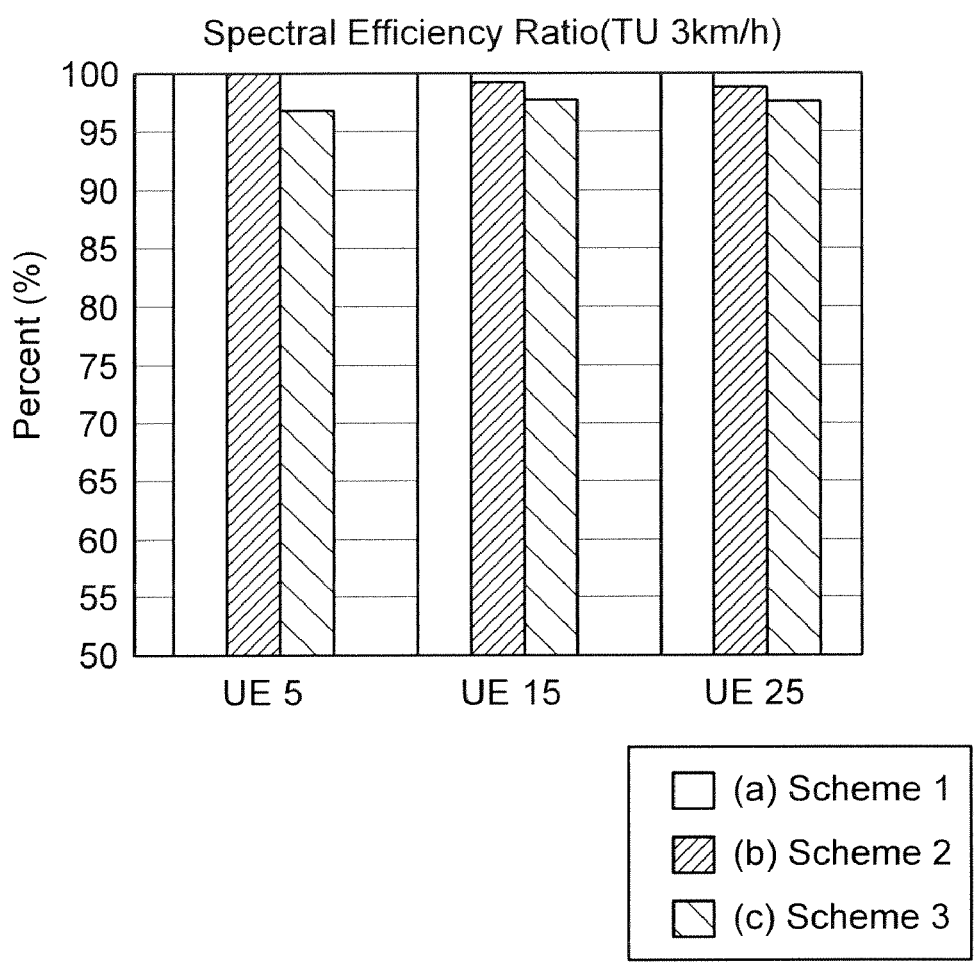
FIG. 28 is a graph showing an example of a data efficiency ratio when an uplink PMI is transmitted.
Figure 29:
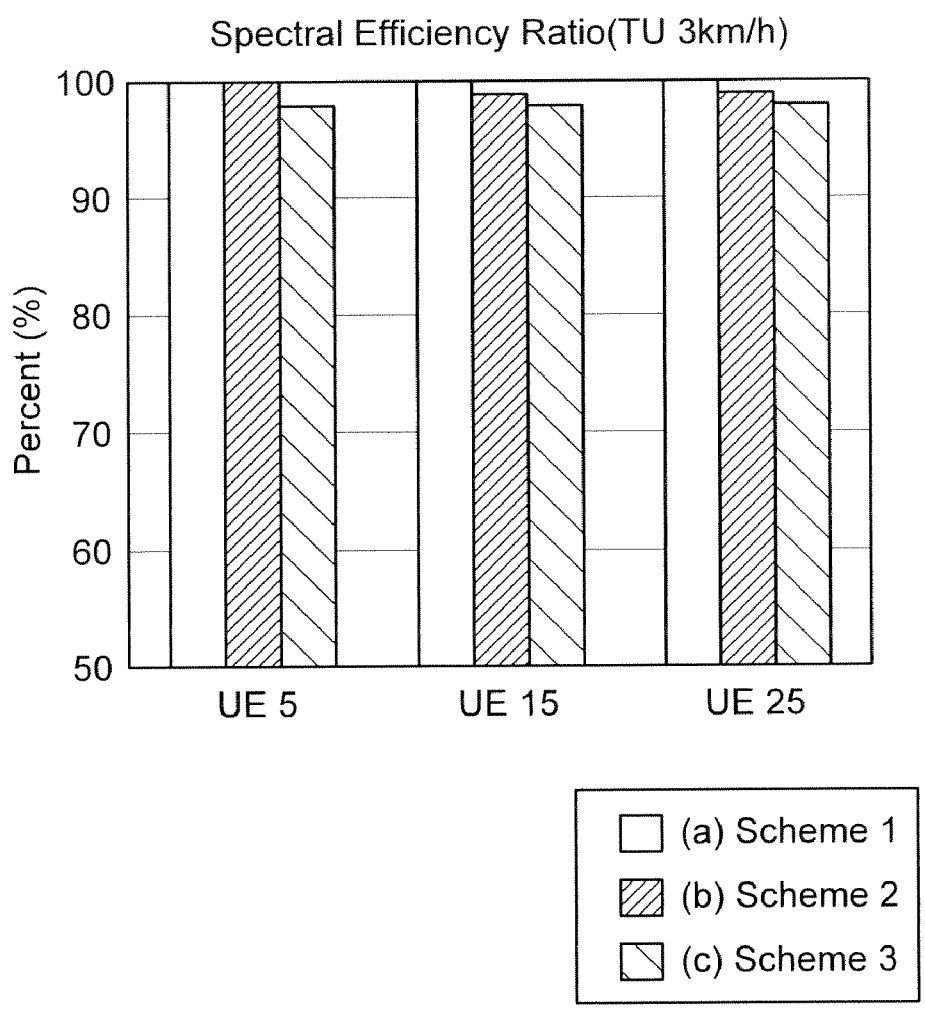
FIG. 29 is a graph showing another example of a data efficiency ratio when an uplink PMI is transmitted.

FIG. 28 is a graph showing an example of a data efficiency ratio when an uplink PMI is transmitted. FIG. 29 is a graph showing another example of a data efficiency ratio when an uplink PMI is transmitted. Four BBs are selected in FIG. 28 (i.e., M=4 in the best-M scheme). Six BBs are selected in FIG. 29 (i.e., M=6 in the best-M scheme).

Referring to FIGS. 28 and 29, "(a) Scheme 1" is a case where a PMI is transmitted as shown in FIG. 25. "(b) Scheme 2" is a case where a PMI is transmitted as shown in FIG. 26. "(c) Scheme 3" is a case where a PMI is transmitted as shown in FIG. 27.

In "Scheme 3", one PMI is transmitted by selecting contiguous BBs and then an RB PMI is transmitted (i.e., a PMI compression scheme). In terms of data efficiency, the use of this scheme shows almost the same result as in a case of transmitting all PMIs. That it, an overhead caused by control signal transmission can be reduced while maintaining system performance.

Figure 30:
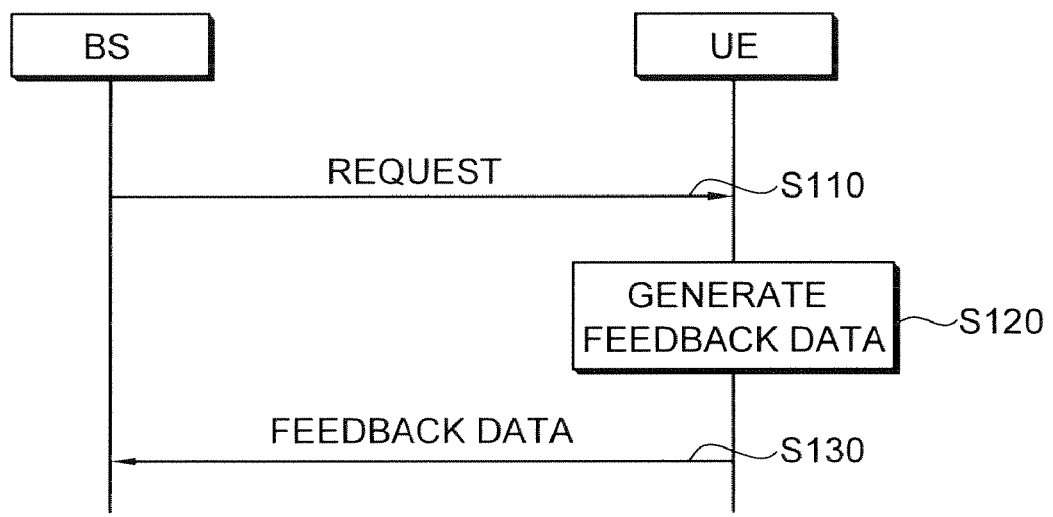
FIG. 30 is a flowchart showing a method for generating feedback data according to an embodiment of the present invention.

FIG. 30 is a flowchart showing a method for generating feedback data according to an embodiment of the present invention.

Referring to FIG. 30, a BS requests a UE to report feedback data through a downlink channel (step S110). The feedback data report request can be transmitted using a request message. The request message may include uplink scheduling information for channel condition reporting and also include information on a frame offset, a reporting type of the feedback data, a transmission period of the feedback data, etc. The uplink scheduling information indicates feedback data transmission and uplink radio resource assignment. The request message may be transmitted through a physical downlink control channel (PDCCH).

The UE generates the feedback data (step S120). The UE extracts channel information from a downlink signal. The channel information may include channel state information (CSI), channel quality information (CQI), user priority information, etc. By using the channel information, the UE selects M SBs from a plurality of SBs according to a channel condition between the UE and the BS. The M SBs may be selected from the plurality of SBs according to a CQI value of each SB. The UE generates the feedback data according to a reporting type of the feedback data. The reporting type may be determined by the BS or may be predetermined by default. For example, the feedback data may include a frequency selective PMI, a frequency flat PMI, a BB CQI, and a WB CQI. The feedback data may further include a bitmap and an RI. The bitmap indicates positions of the selected M SBs. The RI corresponds to the number of useful transmission layers. The BB CQI and the WB CQI may be calculated for each transmission layer. A CQI reporting type may vary according to each layer.

The UE reports the feedback data to the BS through an uplink channel (step S130). The UE transmits the feedback data by using an uplink radio resource allocated according to uplink scheduling information. The uplink radio resource may be a physical uplink shared channel (PUSCH).

The BS performs radio resource scheduling by using the feedback data received from the UE. Errors may occur in the feedback data in the process of transmitting the feedback data. The feedback data transmitted by the UE may not be correctly decoded by the BS, and in this case, the frequency selective PMI cannot be used. Regarding a PMI included in the feedback data, the UE selects a PMI which can be best fit to its channel condition. In terms of improvement of quality of service (QoS), it is preferable that the BS allocates radio resources by using the PMI included in the feedback data.

Figure 31:
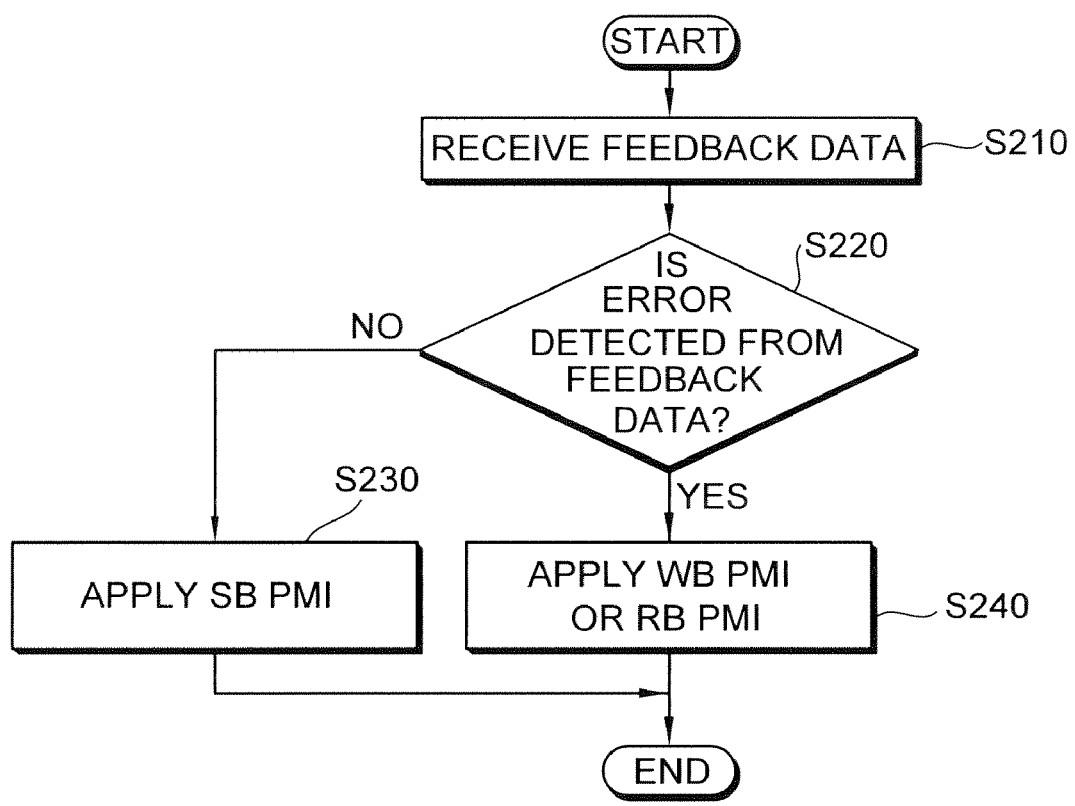
FIG. 31 is a flowchart showing a method for selecting a PMI by detecting an error from feedback data according to an embodiment of the present invention.

FIG. 31 is a flowchart showing a method for selecting a PMI by detecting an error from feedback data according to an embodiment of the present invention. It is assumed herein that a UE transmits feedback data to a BS by using the best-M scheme, wherein the feedback data includes an SB PMI and a WB PMI (or RB PMI).

Referring to FIG. 31, the BS receives the feedback data from the UE (step S210). The feedback data may include a bitmap indicating a BB selected according to the best-M scheme, a PMI of an SB belonging to the BB, and a PMI of an RB (or a WB).

The BS detects an error of the bitmap from the feedback data transmitted by the UE (step S220). Due to noise or fading, the feedback data may not be correctly decoded when it is transmitted from the UE to the BS.

If there is no error in the bitmap, the BS applies the SB PMI transmitted by the UE (step S230). That is, the BS assigns to the UE at least one SB selected by the UE from the BBs. In addition, for a PMI of the assigned SB, the BS applies the SB PMI transmitted by the UE.

Otherwise, if there is an error in the bitmap, the BS applies the WB PMI or the RB PMI (step S240). Since the BS cannot know the BBs due to the bitmap error, the BS cannot use the SB PMI transmitted by the UE. The BS allocates radio resources to the UE according to the WB PMI or the RB PMI transmitted by the UE. The BS reports to the UE a PMI currently in use together with radio resource assignment information by using a downlink control signal.

Since the BS can adaptively select a PMI to be used in radio resources according to a result of detecting errors from feedback data, QoS of wireless communication can be improved.

An overhead caused by transmission of feedback data can be reduced, and radio resource scheduling can be effectively achieved in a multiple antenna system.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A transmitter for transmitting feedback data in a multiple antenna system, the transmitter comprising:
a processor configured to:
receive a request message of feedback data on a downlink channel, the request message comprising uplink scheduling information;
select a set of M subbands within a plurality of subbands, wherein M is greater than or equal to 1;
generate the feedback data, the feedback data comprising a frequency selective precoding matrix indicator (PMI), a frequency flat PMI, a best band channel quality indicator (CQI) and a whole band CQI, the frequency selective PMI indicating an index of a precoding matrix selected from a codebook over the M selected subbands, the frequency flat PMI indicating an index of a precoding matrix selected from the codebook over the plurality of subbands, the best band CQI indicating a CQI value over the M selected subbands, the whole band CQI indicating a CQI value over the plurality of subbands; and
transmit the feedback data on an uplink channel allocated to the uplink scheduling information.

2. The transmitter of claim 1, wherein the feedback data further comprises a rank indicator (RI), the RI corresponding to the number of useful transmission layers, and the best band CQI and the whole band CQI are calculated for each transmission layer.

3. The transmitter of claim 1, wherein the feedback data further comprises a resource indicator which represents positions of the M selected subbands.

4. The transmitter of claim 1, wherein the downlink channel is a physical downlink control channel (PDCCH).

5. The transmitter of claim 1, wherein the uplink channel is a physical uplink shared channel (PUSCH).

6. The transmitter of claim 1, wherein the best band CQI has a differential CQI value with respect to the whole band CQI.

7. The transmitter of claim 1, wherein the uplink scheduling information comprises an indicator indicating transmission of the feedback data and uplink radio resource assignment.

8. The transmitter of claim 1, wherein the set of M subbands is selected within the plurality of subbands according to a CQI for each subband.

9. The transmitter of claim 1, wherein the frequency flat PMI indicates the index of a precoding matrix selected from the codebook for all of the plurality of subbands.

10. A transmitter for transmitting feedback data in a multiple antenna system, the transmitter comprising:
a processor configured to:
select a set of M subbands within a plurality of subbands, wherein M is greater than or equal to 1;
generate the feedback data, the feedback data comprising a frequency selective precoding matrix indicator (PMI), a frequency flat PMI, a best band channel quality indicator (CQI) and a whole band CQI, the frequency selective PMI indicating an index of a precoding matrix selected from a codebook over the M selected subbands, the frequency flat PMI indicating an index of a precoding matrix selected from the codebook over the plurality of subbands, the best band CQI indicating a CQI value over the M selected subbands, the whole band CQI indicating a CQI value over the plurality of subbands; and
transmit the feedback data to a base station.

11. The transmitter of claim 10, wherein the feedback data further comprises a rank indicator (RI), the RI corresponding to the number of useful transmission layers, and the best band CQI and the whole band CQI are calculated for each transmission layer.

12. The transmitter of claim 10, wherein the feedback data further comprises a resource indicator which represents positions of the M selected subbands.

* * * * *